(12) United States Patent
Paksoy et al.

(10) Patent No.: US 8,391,489 B2
(45) Date of Patent: Mar. 5, 2013

(54) PROCESSOR SYSTEM

(75) Inventors: Erdal Paksoy, Richardson, TX (US); Narendar Shankar, Dallas, TX (US); Sven-Inge Redin, Taby (SE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/043,150

(22) Filed: Mar. 8, 2011

(65) Prior Publication Data
US 2011/0161650 A1 Jun. 30, 2011

Related U.S. Application Data

(62) Division of application No. 11/100,690, filed on Apr. 7, 2005, now Pat. No. 7,940,932.

(60) Provisional application No. 60/561,135, filed on Apr. 8, 2004.

(51) Int. Cl.
*H04L 9/00* (2006.01)
*H04K 1/00* (2006.01)
*G06F 9/00* (2006.01)

(52) U.S. Cl. .......... 380/262; 380/46; 380/255; 380/268; 380/278; 713/2

(58) Field of Classification Search .................. 380/247, 380/46, 255, 262, 268, 278; 713/2
See application file for complete search history.

(56) References Cited

U.S. PATENT DOCUMENTS

| | | | |
|---|---|---|---|
| 4,987,595 A | | 1/1991 | Marino, Jr. et al. |
| 5,475,757 A | * | 12/1995 | Kelly ............................ 713/159 |
| 5,721,779 A | * | 2/1998 | Funk ............................ 713/155 |
| 5,917,912 A | | 6/1999 | Ginter et al. |
| 6,071,190 A | | 6/2000 | Weiss et al. |
| 6,201,871 B1 | * | 3/2001 | Bostley et al. ................ 380/249 |
| 6,633,981 B1 | * | 10/2003 | Davis ........................... 713/189 |
| 6,640,304 B2 | | 10/2003 | Ginter et al. |
| 6,708,272 B1 | | 3/2004 | Mc Cown et al. |
| 6,895,504 B1 | * | 5/2005 | Zhang et al. .................. 713/175 |
| 7,181,762 B2 | * | 2/2007 | Jerdonek .......................... 726/2 |
| 7,194,623 B1 | * | 3/2007 | Proudler et al. .............. 713/164 |
| 7,516,323 B2 | | 4/2009 | Inoue et al. |
| 2003/0056107 A1 | | 3/2003 | Cammack et al. |
| 2003/0140205 A1 | | 7/2003 | Dahan et al. |
| 2003/0140244 A1 | | 7/2003 | Dahan et al. |
| 2003/0140245 A1 | | 7/2003 | Dahan et al. |

(Continued)

OTHER PUBLICATIONS

Baron, Max, "Five Chips from Ti—Or, Is It Six?," Microprocessor Report, Mar. 17, 2003, pp. 1-6, Figs. 1, 3-4.

(Continued)

*Primary Examiner* — Mohammad W Reza
(74) *Attorney, Agent, or Firm* — Wade J. Brady, III; Frederick J. Telecky, Jr.

(57) ABSTRACT

An electronic circuit includes a more-secure processor having hardware based security for storing data. A less-secure processor eventually utilizes the data. By a data transfer request-response arrangement between the more-secure processor and the less-secure processor, the more-secure processor confers greater security of the data on the less-secure processor. A manufacturing process makes a handheld device having a storage space, a less-secure processor for executing modem software and a more-secure processor having a protected application and a secure storage. A manufacturing process involves generating a per-device private key and public key pair, storing the private key in a secure storage where it can be accessed by the protected application, combining the public key with the modem software to produce a combined software, signing the combined software; and storing the signed combined software into the storage space. Other processes of manufacture, processes of operation, circuits, devices, wireless and wireline communications products, wireless handsets and systems are disclosed and claimed.

6 Claims, 12 Drawing Sheets

U.S. PATENT DOCUMENTS

2004/0025010 A1 2/2004 Azema et al.
2004/0060060 A1 3/2004 Carr
2005/0164738 A1 7/2005 Liu

OTHER PUBLICATIONS

Suh, G., et al., "AEGIS: Architecture for Tamper-Evident and Tamper-Resistant Processing," ACM Proceedings of International Conference on Supercomputing, Jun. 23-26, 2003, pp. 160-171, Figs. 1,4 Table 1.

Suh, G., et al., "Efficent Memory Integrity Verificaiton and Encryption for Secure Processors," 36th International Symposium on Microarchitecture, IEEE Computing Society, Dec. 2003, pp. 339-350, Fig. 1 [6.1.1].

* cited by examiner

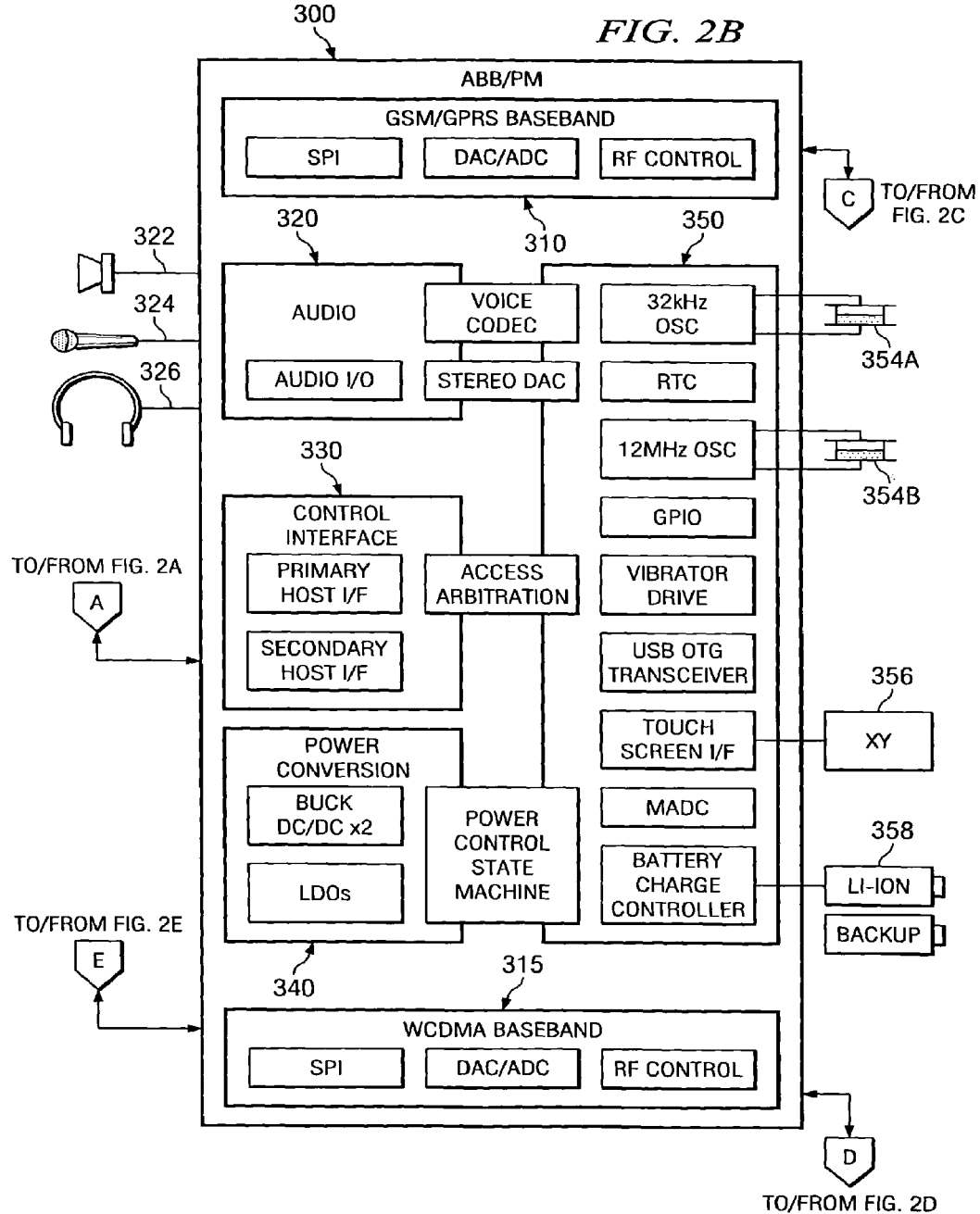

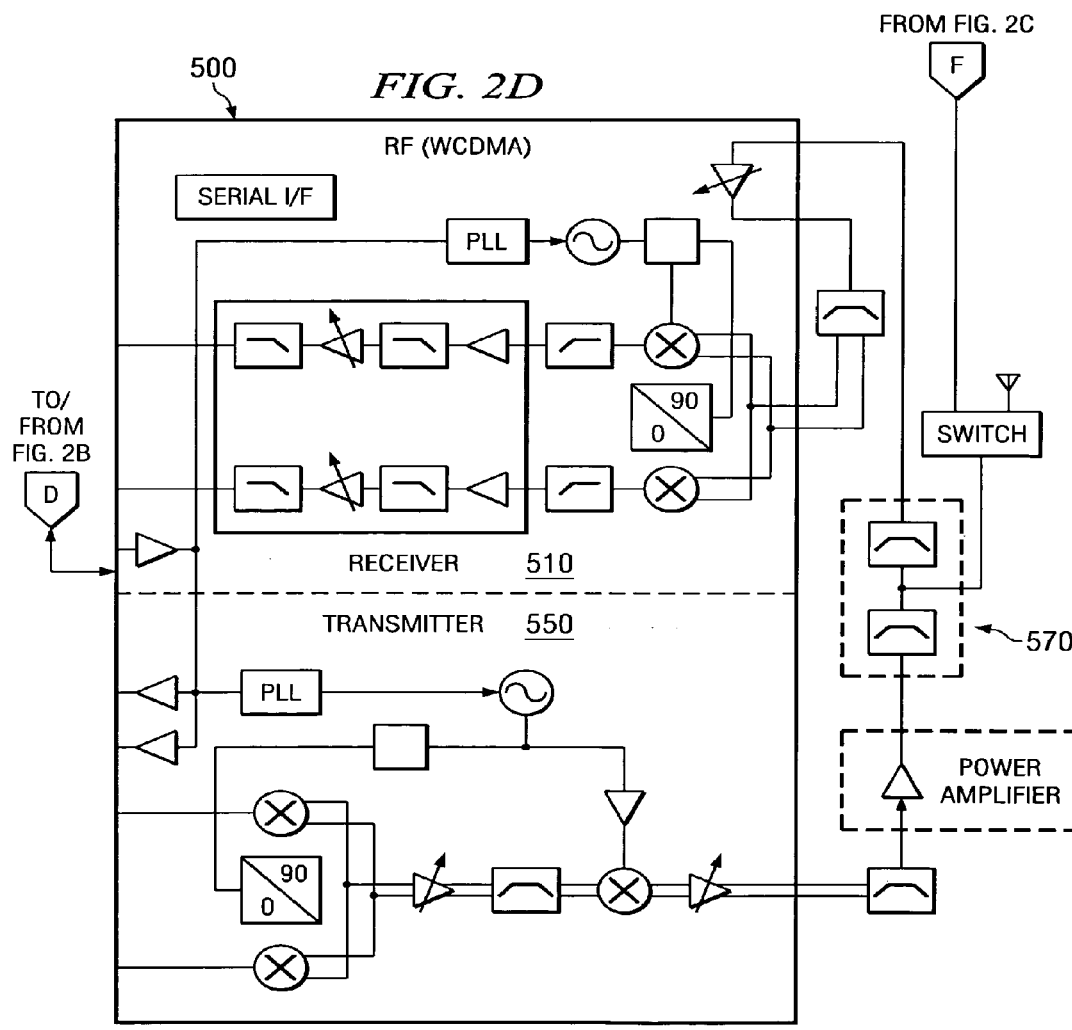

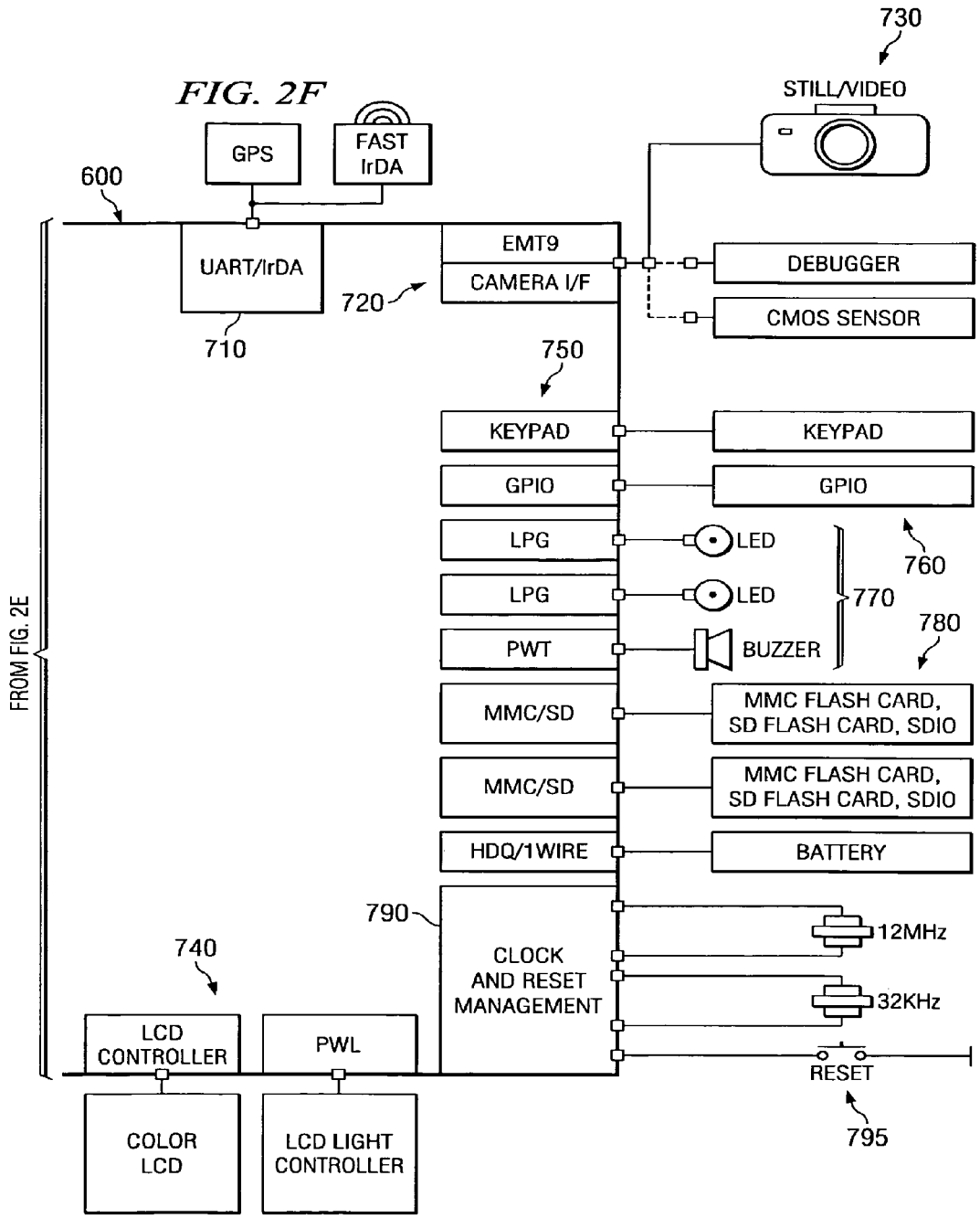

| PUBLIC CHIP ID |
| --- |
| CREATOR ID |
| APPLICATION ID |
| HASH OF BOOTSTRAP AND SW CERTIFICATE |
| HASH OF MODEM SW AND SW CERTIFICATE |
| IMEI CERTIFICATE |
| HMAC |

PROCESSOR SYSTEM

CROSS-REFERENCE TO RELATED APPLICATIONS

This application is related to and is a divisional of U.S. patent application Ser. No. 11/100,690, filed Apr. 7, 2005, titled—METHODS, APPARATUS, AND SYSTEMS FOR SECURING SIM (SUBSCRIBER IDENTITY MODULE) PERSONALIZATION AND OTHER DATA ON A FIRST PROCESSOR AND SECURE COMMUNICATION OF THE SIM DATA TO A SECOND PROCESSOR, for which priority, under 35 U.S.C. 120 and 35 U.S.C. 121, is hereby claimed to such extent as may be applicable and is also hereby incorporated herein by reference.

Application Ser. No. 11/100,690 claims the benefit of the filing date of provisional application, U.S. Ser. No. 60/561,135, filed Apr. 8, 2004, entitled "Methods, Apparatus, and Systems for Securing SIM (Subscriber Identity Module) Personalization and Other Data on a First Processor and Secure Communication of the SIM Data to a Second Processor" to Erdal Paksoy, Narendar Shankar, and Sven-Inge Redin.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for varied levels of security and other information and communication processing purposes, and processes of making them. Without limitation, the background is further described in connection with wireless communications processing.

Wireless communications, of many types, have gained increasing popularity in recent years. Among other types of mobile equipment (ME), the mobile wireless (or "cellular") telephone has become ubiquitous around the world. Mobile telephony has recently begun to communicate video and digital data, in addition to voice. Wireless modems, for communicating computer data over a wide area network, using mobile wireless telephone channels and techniques are also available.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a personal computer or workstation within the same room. Numerous other wireless technologies exist and are emerging.

Security techniques are used to improve the security of retail and other business commercial transactions in electronic commerce and to improve the security of communications wherever personal and/or commercial privacy is desirable. Security is important in both wireline and wireless communications.

Processors of various types, including digital signal processing (DSP) chips and/or other integrated circuit devices are important to these systems and applications. Reducing the cost of manufacture and providing a variety of circuit and system products with performance features for different market segments are important goals in DSPs, integrated circuits generally and system-on-a-chip (SOC) design.

Coassigned U.S. Patent Application Publication 2004/0025010 of J. Azema, E. Balard, A. Chateau, E. Paksoy, and M. Leclercq, describes a computing platform that binds system firmware to a particular computing platform using a manufacturer certificate. A die identification number associated with an individual device is stored in a fused memory array (eFuse) at the time of manufacture and can be compared with the manufacturer certificate to bind the code to the platform.

Further alternative, improved and otherwise advantageous solutions are desirable in the art.

SUMMARY OF THE INVENTION

Generally, one form of the invention includes a first processor having hardware-based security, a first memory coupled to the first processor and having data stored in said memory, a second processor having a second memory and operable to authenticate the data in the first processor, and the first processor operable upon completion of the authentication to send the data from the memory of the first processor to a second memory external to the first processor.

Generally, another form of the invention involves an electronic circuit including a more-secure processor having hardware based security for storing sensitive data, a less-secure processor that eventually utilizes the sensitive data; and a data transfer request-response protocol between the more-secure processor and the less-secure processor for the more-secure processor to confer greater security of the sensitive data on the less-secure processor.

Generally, a further form of the invention involves a process of manufacturing a cellular telephone having a storage space, a less-secure processor for executing modem software and a more-secure processor having a protected application and a secure storage. The manufacturing process involves generating a per-device private key and public key pair, storing the private key in a secure storage where it can be accessed by the protected application, combining the public key with the modem software to produce a combined software, signing the combined software; and storing the signed combined software into the storage space.

Generally, a still further form of the invention involves a system including at least two more-secure processors having more-secure processing partitioned among said more-secure processors; and at least one less-secure processor.

Other forms of the invention involving processes of manufacture, processes of operation, circuits, devices, wireless and wireline communications products, wireless handsets and systems are disclosed and claimed.

BRIEF DESCRIPTION OF THE DRAWINGS

FIGS. 2A-2G are block diagrams of inventive integrated circuit chips for use in the blocks of the communications system of FIG. 1.

FIG. 2A is a block diagram of an integrated circuit including a digital baseband section, the integrated circuit provided on a printed circuit board system of integrated circuit chips for use in one or more of the system blocks of FIG. 1.

FIG. 2B is a block diagram of an integrated circuit including an analog baseband section, the integrated circuit provided on a printed circuit board system of integrated circuit chips for use in one or more of the system blocks of FIG. 1.

FIG. 2C is a block diagram of an integrated circuit including a GSM/GPRS RF (radio frequency) unit, the integrated circuit on a printed circuit board system of integrated circuit chips for use in one or more of the system blocks of FIG. 1.

FIG. 2D is a block diagram of an integrated circuit including a WCDMA (wideband code division multiple access) RF (radio frequency) unit, the integrated circuit on a printed circuit board system of integrated circuit chips for use in one or more of the system blocks of FIG. 1.

FIGS. 2E and 2F are two halves of a block diagram of an integrated circuit including application processor circuitry, the integrated circuit provided with off-chip peripherals on a printed circuit board system of integrated circuit chips for use in one or more of the system blocks of FIG. 1.

FIG. 2G is a block diagram of a WLAN integrated circuit including MAC (media access controller), PHY (physical layer) and AFE (analog front end), the integrated circuit on a printed circuit board system of integrated circuit chips for use in one or more of the system blocks of FIG. 1.

Corresponding numerals designate corresponding parts in the drawings except where the context indicates otherwise.

DETAILED DESCRIPTION OF EMBODIMENTS

Figure 1:
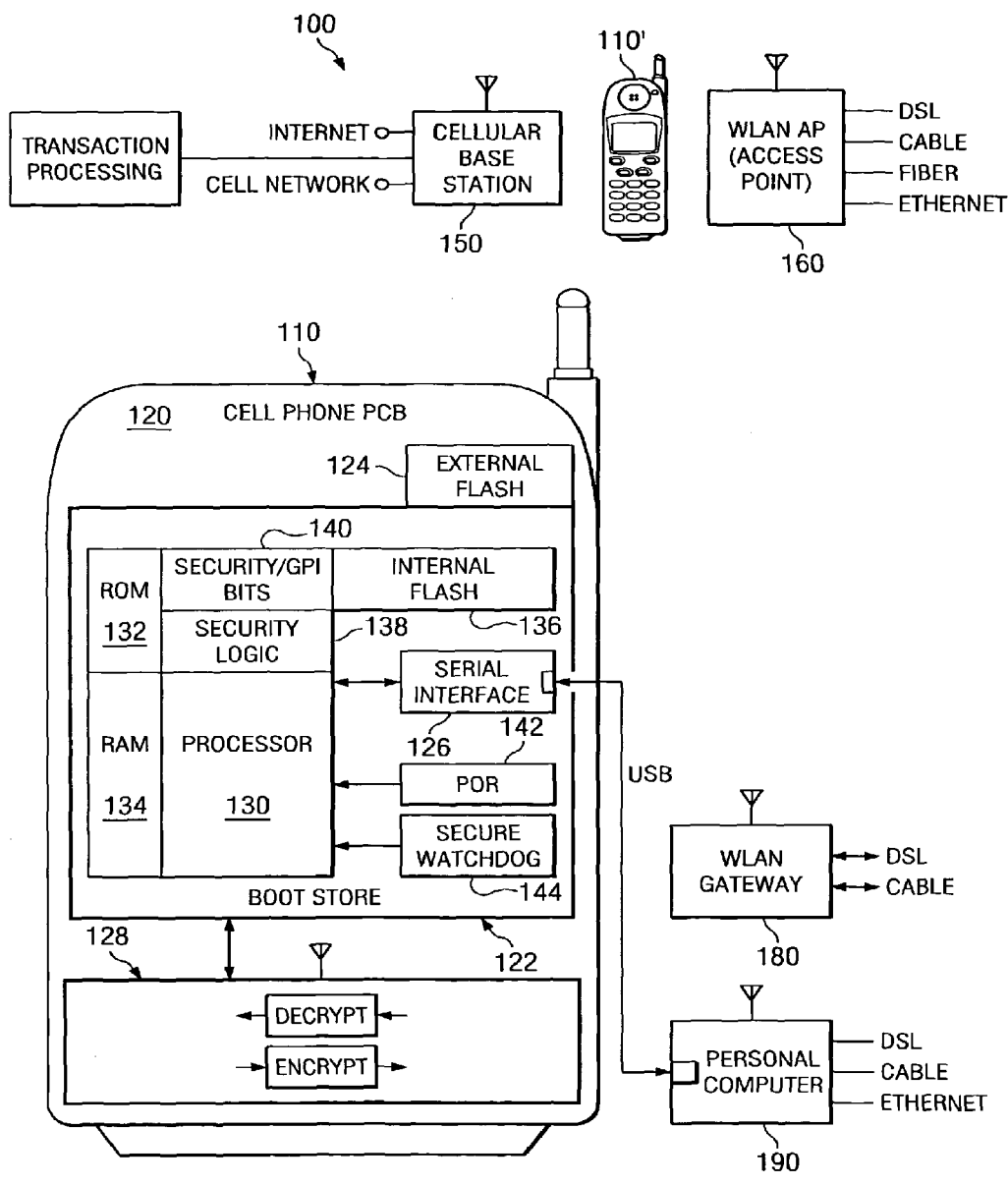
FIG. 1 is a pictorial diagram of a communications system including system blocks, for example a cellular base station, a WLAN AP (wireless local area network access point), a WLAN gateway, a personal computer, and two cellular telephone handsets, any one, some or all of the foregoing improved according to the invention.

In FIG. 1 an improved communications system 100 has system blocks with selectively-determinable security level. Any or all of the system blocks, such as cellular telephone and data handsets 110 and 110', a cellular (telephony and data) base station 150, a WLAN AP (wireless local area network access point, IEEE 802.11 or otherwise) 160, a WLAN gateway 180, and a personal computer (PC) 190, communicate with each other in communications system 100. Each of the system blocks 110, 110', 150, 160, 180, 190 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), fiber (fiber optic cable to premises), and Ethernet wideband network. Cellular base station 150 two-way communicates with the handsets 110, 110', and with the Internet, with cellular communications networks and with PSTN (public switched telephone network). Cellular base station 150 locally and/or remotely interfaces with Transaction Processing to support secure commercial content, secure financial services, and other services over cellular telephone networks, over the Internet and on other networks.

In this way advanced networking capability for services and content, such as cellular telephony and data, audio, music, voice, video, e-mail, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and enjoyment appropriate to the just-listed and other particular applications, while recognizing market demand for different levels of security. The embodiments, applications and system blocks disclosed herein are suitably implemented are suitably implemented in fixed, portable, mobile, automotive, seaborne, and airborne, communications, control, and other apparatus.

For example, handset 110 is improved for selectively determinable security and economy when manufactured. Handset 110 remains interoperable and able to communicate with all other similarly improved and unimproved system blocks of communications system 100. On a cell phone printed circuit board (PCB) 120 in handset 110, there is provided a higher-security processor integrated circuit 122, an external flash memory 124, and a serial interface 126. Serial interface 126 is suitably a wireline interface, such as a USB interface connected by a USB line to the personal computer 190 when the user desires and for reception of software intercommunication and updating of information between the personal computer 190 (or other originating sources external to the handset 110) and the handset 110. Such intercommunication and updating also occur via a lower-security processor such as for cellular modem, WLAN, Bluetooth, or other wireless or wireline modem processor and physical layer (PHY) circuitry 128.

Processor integrated circuit 122 includes at least one processor (or central processing unit CPU) block 130 coupled to an internal (on-chip read-only memory) ROM 132, an internal (on-chip random access memory) RAM 134, and an internal (on-chip) flash memory 136. A security logic circuit 138 is coupled to secure-or-general-purpose-identification value (Security/GPI) bits 140 of a non-volatile one-time alterable Production ID register or array of electronic fuses (E-Fuses). Such E-Fuses are an example of an identification code storage holding an identification value. These E-Fuses are programmed in different units of the handset 110, 110' to thereby provide a security identification store having non-volatile bits representing whether the wireless handset (or other system block) is a less secure ("GP" herein) type or more high-security type ("HS" herein). Depending on the Security/GPI bits 140, boot code residing in ROM 132 responds differently to a Power-On Reset (POR) circuit 142 and to a secure watchdog circuit 144 coupled to processor 130. A device-unique security key is suitably also provided in the E-fuses or downloaded to other non-volatile, difficult-to-alter parts of the cell phone unit 110.

It will be noted that the words "internal" and "external" as applied to a circuit or chip respectively refer to being on-chip or off-chip of the applications processor chip 122. All items are assumed to be internal to an apparatus (such as a handset, base station, access point, gateway, PC, or other apparatus) except where the words "external to" are used with the name of the apparatus, such as "external to the handset."

ROM 132 provides a boot storage having boot code that is executable in different boot sequences. One or more of RAM 134, internal flash 136, and external flash 124 are also suitably used to supplement ROM 132 for boot storage purposes. Processor 130 is an example of circuitry coupled to the identification code storage 140 to execute a selected boot sequence from the boot code in the boot storage either for more-secure operation or for less-secure operation of the processor.

Processor 130 is also responsive to one or more other inputs to execute further selected boot sequences from the boot code, or boot modes in a boot sequence. These other inputs are suitably provided by hardware on the PCB 120 connecting to a boot mode input pin of chip 122, configuration values stored in ROM 132 or other memories, and by the power-on reset circuit POR 142. Further, the boot code in the boot storage suitably includes code that loads software external to the wireless handset via the wireless interface(s) 128 and/or the serial interface 126 into external flash memory 124 and internal flash memory 136 depending on the selected boot sequence.

Processor 130 is coupled to the on-chip boot ROM 132, to the power-on reset circuit 142 and to the security identification bits 140 to selectively execute boot code depending on the non-volatile information of the security identification bits 140. Processor 130 is responsive to a security identification value represented by the bits 140 to recognize boot code and modem software code that is intended for that particular unit 110—in other words, "device bound."

A secure watchdog circuit 144 automatically counts down to zero and hard-resets the circuitry 122, 124 unless properly-operating software in the cellular telephone 110 periodically reloads the watchdog counter to prevent it from reaching zero. In this way, many software errors and much security hacking are minimized and obviated.

FIGS. 2A-2G illustrate inventive integrated circuits for use in the blocks 110, 110', 150, 160, 180, 190 of the communications system 100 of FIG. 1. The skilled worker uses, replicates and adapts the integrated circuits to the particular parts of the communications system 100 as appropriate to the functions intended. For conciseness of description and without limitation, the integrated circuits are described with particular reference to use of all of them in the cellular telephone handsets 110 and 110' by way of example. Also, the architecture of integrated circuit 122 is suitably incorporated into one or more of integrated circuit 200 of FIG. 2A, integrated circuit 600 of FIGS. 2E and 2F, and integrated circuit 800 of FIG. 2G, for instance.

It is contemplated that the skilled worker uses each of the integrated circuits shown, or such selection from the complement of blocks therein provided into appropriate other integrated circuit chips, in a manner optimally combined or partitioned between the chips, to the extent needed by any of the applications supported by the cellular telephone base station 150, personal computer(s) 190 equipped with WLAN, WLAN access point 160 and WLAN gateway 180, as well as radios and televisions, fixed and portable entertainment units, routers, pagers, personal digital assistants (PDA), organizers, scanners, faxes, copiers, household appliances, office appliances, combinations thereof, and other application products now known or hereafter devised in which increased, or decreased, selectively determinable security and economy of communication are desirable.

Figure 2A:
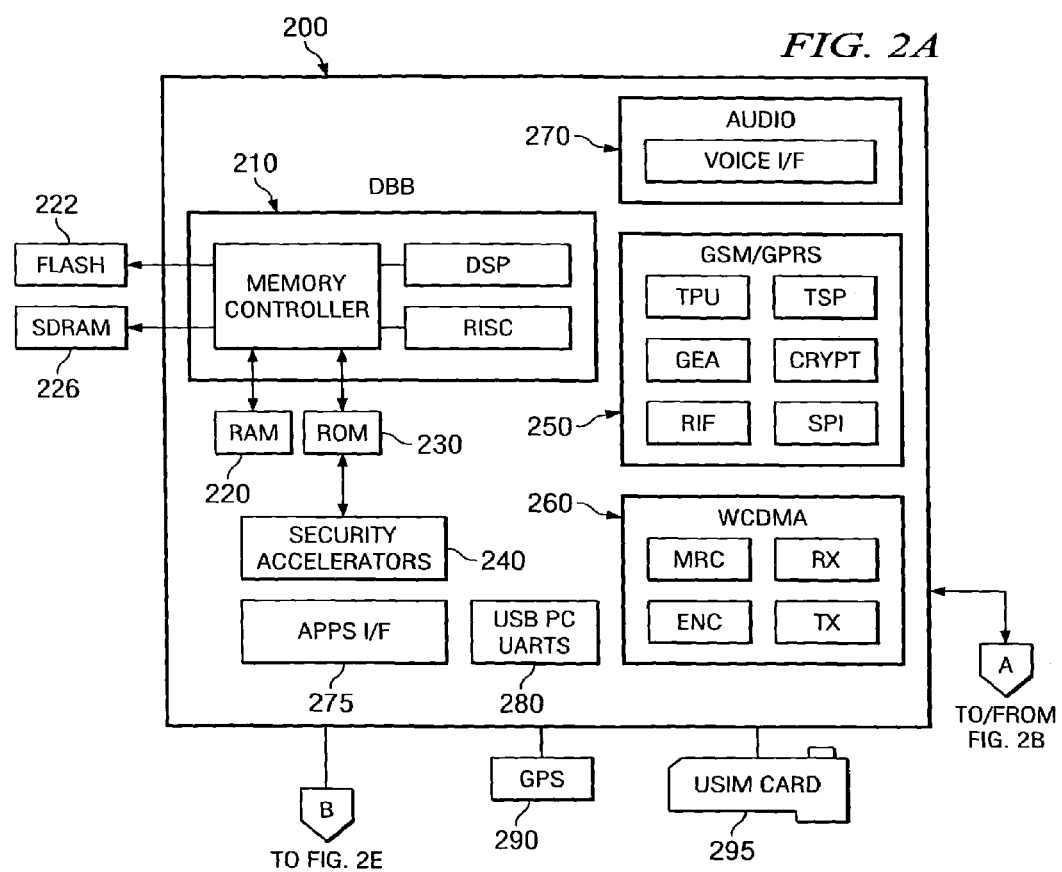

In FIG. 2A, an integrated circuit 200 includes a digital baseband (DBB) block 210 that has a RISC processor (such as MIPS core, ARM processor, or other suitable processor), a digital signal processor (DSP) such as from the TMS320C55x™ DSP generation from Texas Instruments Incorporated or other digital signal processor, and a Memory Controller interfacing the RISC and the DSP to a Flash memory 222 and a SDRAM (synchronous dynamic random access memory) 226. On chip RAM 220 and on-chip ROM 230 also are accessible to the processors via the memory controller. Security accelerators block 240 provide additional computing power such as for hashing and encryption that are accessible, for instance, when the integrated circuit 200 is operated in a security level enabling the security accelerators block 240 and affording types of access to the security accelerators depending on the security level and/or security mode. Digital circuitry 250 supports and provides interfaces for one or more of GSM, GPRS, EDGE, and UMTS (Global System for Mobile communications, General Packet Radio Service, Enhanced Data Rates for Global Evolution, Universal Mobile Telecommunications System) wireless, with or without high speed digital data service, via the analog baseband chip 300 of FIG. 2B and GSM chip 400 of FIG. 2C. Digital circuitry 250 includes ciphering processor CRYPT for GSM A51 and/or A52 ciphering or and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 250.

Digital circuitry 260 provides codec for CDMA (Code Division Multiple Access), CDMA2000, and/or WCDMA (wideband CDMA) wireless with or without an HSDPA (High Speed Downlink Packet Access) (or 1xEV-DV, 1xEV-DO or 3xEV-DV) data feature via the analog baseband chip 300 of FIG. 2B and the CDMA chip 500 of FIG. 2D. Digital circuitry 260 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Block ENC has blocks for uplink and downlink supporting the F8 confidentiality algorithm and the F9 integrity algorithm of WCDMA or otherwise suitable encryption/decryption processes for the communications application.

Audio/voice block 270 supports audio, voice and voice-over-packet (VoP and/or VoIP) functions and interfacing. Applications interface block 275 couples the digital baseband 210 to an applications processor 600 of FIGS. 2E and 2F. Serial interface 280 interfaces from parallel on-chip digital busses to USB (Universal Serial Bus) of a PC (personal computer) 190. Serial interface 280 includes UARTs (universal asynchronous receiver/transmitter circuit) for performing the conversion of data between parallel and serial lines. Chip 200 is coupled to location-determining circuitry 290 for GPS (Global Positioning System), and to a USIM (UMTS Subscriber Identity Module) 295 or other SIM.

Figure 2C:
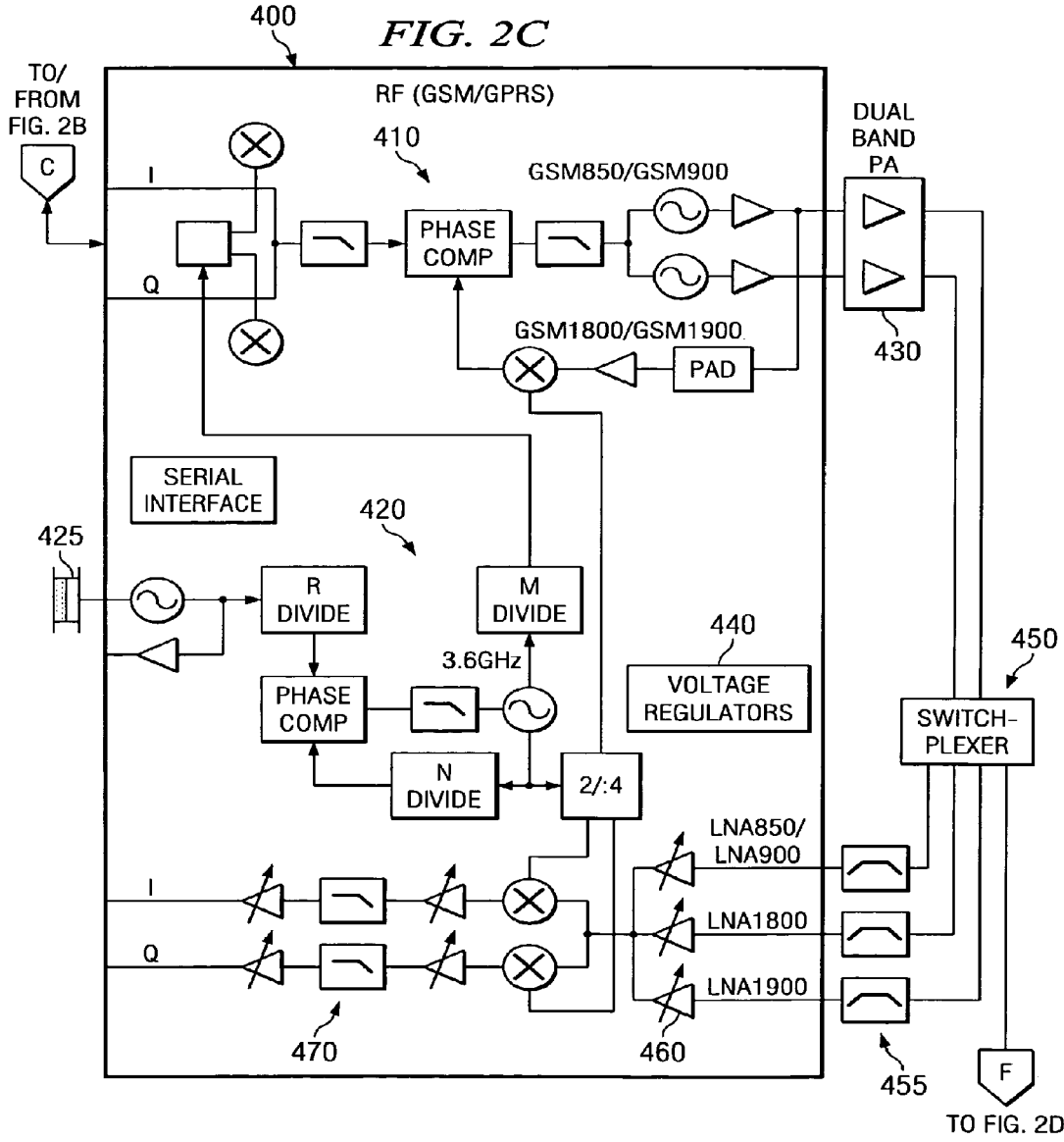

In FIG. 2B a mixed-signal integrated circuit 300 includes an analog baseband (ABB) block 310 for GSM/GPRS/EDGE/UMTS which includes SPI (Serial Port Interface), digital-to-analog/analog-to-digital conversion DAC/ADC block, and RF (radio frequency) Control pertaining to GSM/GPRS/EDGE/UMTS and coupled to RF (GSM etc.) chip 400 of FIG. 2C. Block 315 is an analogous ABB for CDMA, CDMA2000, and/or WCDMA wireless and/or any associated HSDPA data (or 1xEV-DV, 1xEV-DO or 3xEV-DV data and/or voice) with its respective SPI (Serial Port Interface), digital-to-analog conversion DAC/ADC block, and RF Control pertaining to said CDMA types and coupled to an RF chip 500 of FIG. 2D. An audio block 320 has audio I/O (input/output)

circuits to a speaker 322, a microphone 324, and headphones 326. Audio block 320 is coupled to a voice codec and a stereo DAC (digital to analog converter), which in turn have the signal path coupled to the baseband blocks 310 and 315 with suitable encryption/decryption activated or not.

A control interface 330 has a primary host interface (I/F) and a secondary host interface to DBB-related integrated circuit 200 of FIG. 2A for the respective GSM and CDMA paths. The integrated circuit 300 is also interfaced via arrow E to the I2C port of applications processor chip 600 of FIG. 2E. Control interface 330 is also coupled via access arbitration circuitry to the interfaces in circuits 350 and the basebands 310 and 315. A power conversion block 340 includes buck voltage conversion circuitry for DC-to-DC conversion, and low-dropout (LDO) voltage regulators for power management/sleep mode of respective parts of the chip regulated by the LDOs. Power conversion block 340 provides information to and is responsive to a power control state machine shown between the power conversion block 340 and circuits 350.

Circuits 350 provide a 32 KHz oscillator and 12 MHz oscillator for clocking chip 300. The oscillators have frequencies determined by respective crystals 354A and 354B. Circuits 350 include a RTC real time clock (time/date functions), general purpose I/O input/output, a vibrator drive (supplement to cell phone ringing features), a USB On-The-Go (OTG) transceiver, and touch screen interface. A touch screen 356 off-chip is connected to the touch screen interface on-chip. Batteries such as a lithium-ion battery 358 and backup battery provide power to the system and battery data on suitably provided separate lines from the battery pack. When needed, the battery also receives charging current from the Battery Charge Controller in analog circuit 350 which includes MADC (Monitoring ADC and analog input multiplexer such as for on-chip charging voltage and current, and battery voltage lines, and off-chip battery voltage, current, temperature) under control of the power control state machine.

In FIG. 2C an RF integrated circuit 400 includes a GSM/GPRS/EDGE/UMTS RF transmitter block 410 supported by oscillator circuitry 420 with off-chip crystal 425. Transmitter block 410 is fed by baseband block 310 of FIG. 2B. Transmitter block 410 drives an off-chip dual band RF power amplifier (PA) 430. On-chip voltage regulators 440 maintain appropriate voltage under conditions of varying power usage. Off-chip switchplexer 450 couples to wireless antenna and switch circuitry in FIG. 2D and to both the transmit portion 410, 430 in FIG. 2C and the receive portion next described. Switchplexer 450 is coupled via band-pass filters 455 to receiving LNAs 460 (low noise amplifiers) for 850/900 MHz, 1800 MHz, 1900 MHz and other appropriate communication bands. Depending on the band in use, the output of LNAs 460 couples to GSM/GPRS/EDGE/UMTS demodulator 470 to produce the I/Q outputs thereof (in-phase, quadrature) to the GSM/GPRS/EDGE/UMTS baseband block 310 in FIG. 2B.

In FIG. 2D an integrated circuit 500 supports CDMA (code division multiple access), CDMA2000 and/or WCDMA (wideband CDMA), etc. at RF (radio frequency) in a receiver section 510 and a transmitter section 550. The cellular telephone antenna of the cellular telephone handset 110 couples to a switch unit SWITCH and bandpass filters 570 that in turn couple to the GSM circuits of FIG. 2C and the CDMA circuits of FIG. 2D. The receiver output lines at upper left and transmitter input lines at lower left are all coupled to the WCDMA/HSDPA baseband block 315 in FIG. 2B.

Figure 2E:
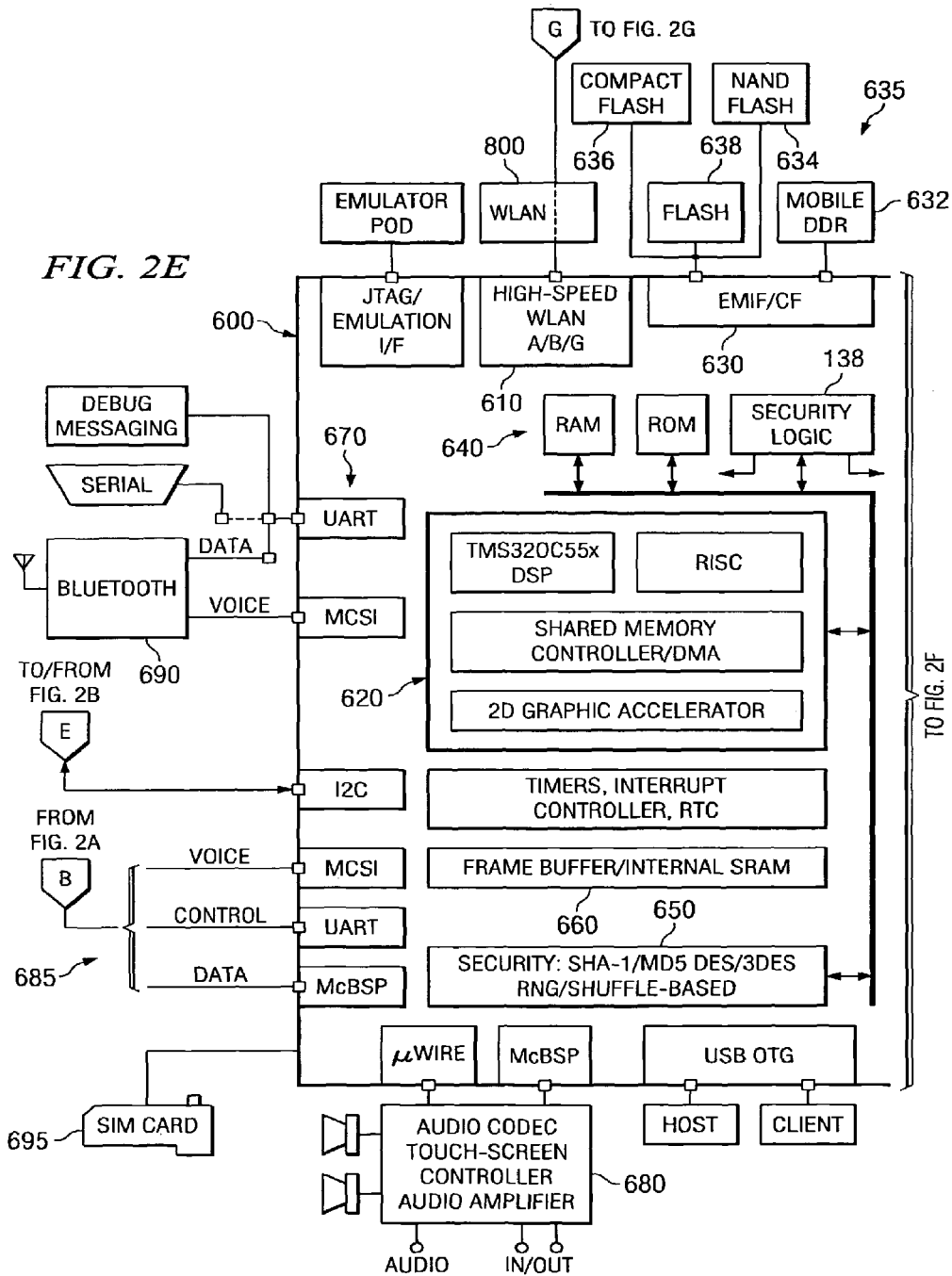

In FIGS. 2E and 2F are illustrated two halves of the block diagram of an integrated circuit chip 600 for applications (apps) processing and various off-chip peripherals. This apps processor is an example of a more-secure secure processor compared to less-secure modem processor 200 of FIG. 2A and WLAN processor 800 of FIG. 2G. This apps processor is suitably provided by or in an OMAP™ product from Texas Instruments Incorporated or another apps processor. The acronym "MPU" later hereinbelow is also used to refer to the more-secure processor. Some of the improvements herein are particularly advantageous when the apps processor has hardware-based security such as security logic 138 and a true random number generator (RNG), and when the modem processor 200 and/or 800 lacks these features. Remarkably, the more-secure features of the apps processor are conferred on the less-secure modem processor, with a considerable improvement in both security and economy of the system.

Figure 2G:
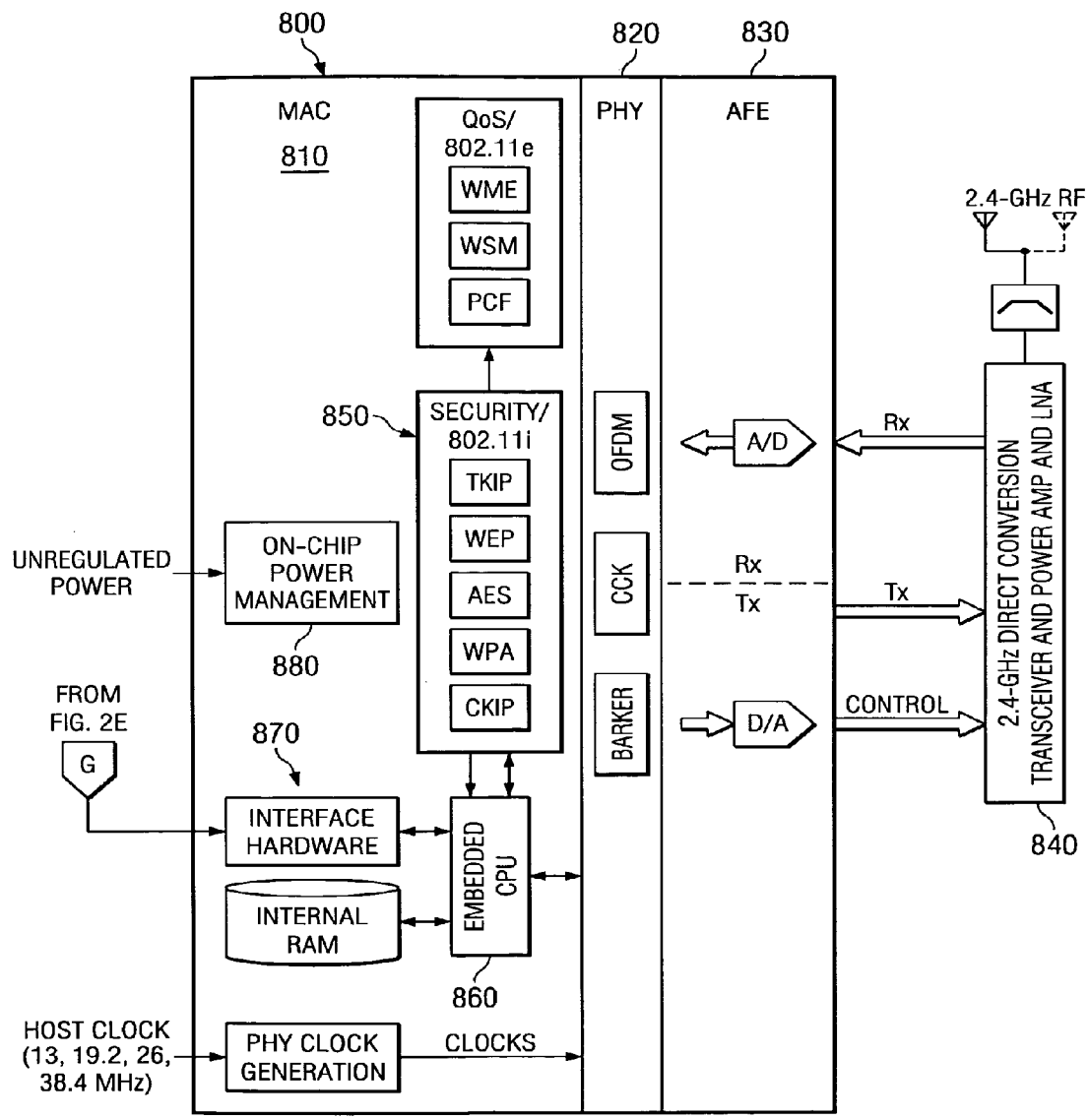

Beginning with FIG. 2E, on-chip are found a high-speed WLAN 802.11a/b/g interface circuit 610 coupled to a WLAN chip 800 of FIG. 2G.

Further provided on chip 600 of FIG. 2E is an applications processing section 620 which includes a RISC processor (such as MIPS core, ARM processor, or other suitable processor), a digital signal processor (DSP) such as from the TMS320C55x™ DSP generation from Texas Instruments Incorporated or other digital signal processor, and a shared memory controller with DMA (direct memory access), and a 2D (two-dimensional display) graphic accelerator. The RISC and the DSP have access via on-chip extended memory interface (EMIF/CF) 630 to off-chip memory resources 635 including as appropriate, SDRAM, mobile DDR (double data rate) DRAM, and flash memory of any of NAND Flash, NOR Flash, and Compact Flash. On-chip, the shared memory controller and DMA (direct memory access) in circuitry 620 interfaces the RISC and the DSP via on-chip bus to on-chip memory 640 with RAM and ROM. The 2D graphic accelerator is coupled to frame buffer internal SRAM (static random access memory) 660.

Figure 5:
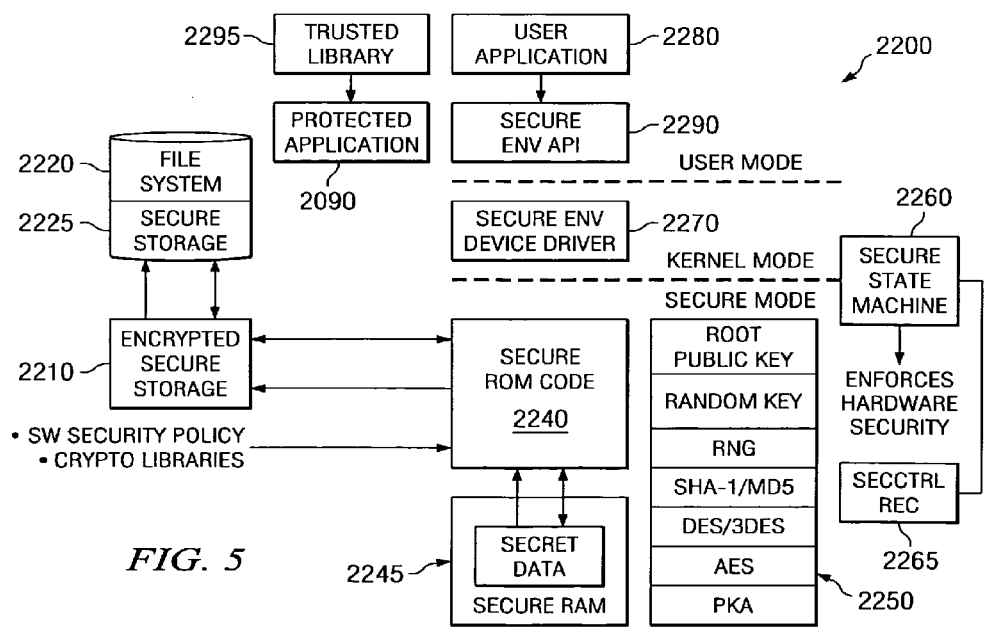
FIG. 5 is a partially block, partially process diagram for improved security using storage areas, a secure state machine and a processor operated by a process having a user mode, a kernel mode, and a secure mode.

Security logic 138 of FIG. 1 and FIG. 2E includes hardware-based protection circuitry, also called security monitoring logic or a secure state machine 2260 of FIG. 5. Security logic 138 is coupled to and monitors busses and other parts of the chip for security violations and protects and isolates the protected areas. Security logic 138 makes secure ROM space inaccessible, makes a Security Control Register SECCTRL inaccessible, makes secure RAM space inaccessible and establishes any other appropriate protections to additionally foster security. In one embodiment such a software jump from flash to secure ROM, for instance, causes a security violation wherein, for example, the security logic 138 produces an automatic immediate reset of the chip. In another embodiment, such a jump causes the security monitoring logic to produce an error message and a re-vectoring of the jump away from secure ROM. Other security violations would include attempted access to Security Control Register SECCTRL or attempted access to secure RAM space.

Further in FIG. 2E, security block 650 includes secure hardware accelerators having security features and provided for accelerating encryption and decryption of any one or more types known in the art. A random number generator RNG is provided in security block 650. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Improvements are suitably implemented as described especially in connection with integrated circuit 122 of FIG. 1 and elsewhere herein as related to FIG. 2E processing section 620, security logic 138, security block 650, RAM and ROM 640, and EMIF/CF block 630 (Extended Memory Interface and Compact Flash Interface).

Further in FIG. 2E, on-chip peripherals 670 include UART data interface and MCSI (Multi-Channel Serial Interface) voice interface for off-chip Bluetooth short distance wireless circuit 690. Debug messaging and serial interfacing are also available through the UART. A JTAG emulation interface couples to an off-chip emulator for test and debug.

Further in peripherals 670 are an I2C interface to analog baseband ABB chip 300 of FIG. 2B, and an interface 685 to applications interface 275 of integrated circuit chip 200 having digital baseband DBB in FIG. 2A. Interface 685 includes a MCSI voice interface, a UART interface for controls, and a multi-channel buffered serial port (McBSP interface) for data. Timers, interrupt controller, and RTC (real time clock) circuitry are provided in chip 600.

Further in peripherals 670 are a MicroWire (u-wire 4 channel serial port) and multi-channel buffered serial port (McBSP interface) to off-chip Audio codec, a touch-screeen controller, and audio amplifier 680 to stereo speakers. External audio content and touch screen (in/out) are suitably provided. Additionally, an on-chip USB OTG interface couples to off-chip Host and Client devices. These USB communications are suitably directed outside handset 110 such as to PC 190 (personal computer) and/or from PC 190 to update the handset 110.

A SIM (subscriber identification module) magnetic or smart integrated circuit card 695 is inserted into the cellular phone 110 and coupled to provide subscriber identification information directly to apps processor 600. In some embodiments, SIM card 695 is omitted and the information is suitably coupled from USIM 295 in FIG. 2A via lines 685 to apps processor 600 of FIG. 2E. In other embodiments where a SIM card is used, the USIM card 295 is omitted and SIM card 695 is directly coupled to apps processor 600.

Turning to FIG. 2F, chip 600 includes further interfaces and features. Note that the block diagram of FIGS. 2E and 2F is understood as providing on-chip peripheral bussing and couplings between the application processing circuitry 620 and the various on-chip peripheral blocks, regardless of whether the diagram lacks explicitly-shown busses and couplings, as is understood by the skilled worker.

An on-chip UART/IrDA (infrared data) interface 710 couples to off-chip GPS (global positioning system) and Fast IrDA infrared communications device. An interface 720 provides EMT9 and Camera interfacing to one or more off-chip still cameras or video cameras 730, and/or to a CMOS sensor of radiant energy, and/or to a debugger.

Further in FIG. 2F, an on-chip LCD controller and associated PWL (Pulse-Width Light) block 740 are coupled to a color LCD display and its LCD light controller off-chip. Further, on-chip interfaces 750 are respectively provided for off-chip keypad and GPIO 760, on-chip LPG (LED Light Emitting Diode Pulse Generator) and PWT (Pulse-Width Tone) interfaces are respectively provided for off-chip LED and buzzer peripherals 770. GPIO 760 has several chip pins for inputs.

On-chip MMC/SD multimedia and flash interfaces are provided for off-chip MMC Flash card, SD flash card and SDIO peripherals 780. An on-chip selectable-mode HDQ or 1-Wire (hardware protocols) battery monitoring serial interface module is provided for monitoring the off-chip Battery. On-chip Clock and Reset management circuitry 790 (coupled also to POR 142 of FIG. 1) is connected to off-chip 12 MHz and 32 KHz crystals and to a reset pushbutton switch 795.

In FIG. 2G, a WLAN integrated circuit 800 includes MAC (media access controller) 810, PHY (physical layer) 820 and AFE (analog front end) 830. PHY 820 includes blocks for BARKER coding, CCK, and OFDM. PHY 820 receives PHY Clocks from a clock generation block supplied with suitable off-chip host clock, such as at 13, 16.8, 19.2, 26, or 38.4 MHz. These clocks are often found in cell phone systems and the host application is suitably a cell phone or any other end-application.

AFE 830 is coupled by receive (Rx), transmit (Tx) and CONTROL lines to an off-chip WLAN RF circuitry 840. WLAN RF 840 includes a 2.4 GHz (and/or 5 GHz) direct conversion transceiver and power amplifer and has low noise amplifier LNA in the receive path. Bandpass filtering couples WLAN RF 840 to a WLAN antenna.

In MAC 810, Security circuitry 850 supports any one or more of various encryption/decryption processes such as WEP (Wired Equivalent Privacy), RC4, TKIP, CKIP, WPA, AES (advanced encryption standard), 802.11i and others.

The security circuitry and processes depicted in FIGS. 1, 3, 4, 5 and 6 are suitably provided by more-secure apps processor 600 and their benefits conferred on cellular modem processor 200 of FIG. 2A and/or conferred on WLAN security block 850 and WLAN processor 860 of FIG. 2G. In this way security of cellular telephone, data and video communications, voice-over-packet, and other voice, audio, video, financial, content and other services over all types of wireless and wireline physical layers (PHYs) are enhanced.

Further in FIG. 2G, processor 860 comprised of an embedded CPU (central processing unit) is connected to internal RAM and ROM and coupled to provide QoS (Quality of Service) IEEE 802.11e operations WME, WSM, and PCF (packet control function). Security block 850 in FIG. 2G has busing for data in, data out, and controls interconnected with CPU 860. Interface hardware 870 and internal RAM on-chip couples CPU 860 with (see FIG. 2E) interface 610 of applications processor integrated circuit 600 of FIG. 2E.

The description herein next turns to the considerations noted above and provides further detailed description.

The apps processor has hardware based security which can be used for storing SIM personalization data. SIM (Subscriber Identity Module) refers to a smart card identification of the user in GSM wireless. HW (hardware) security makes it possible to meet new GSMA (GSM Association in wireless) regulations on tamper-protection (and confidentiality) of the SIM personalization information. The apps processor, which stores the personalization data, has to work with a Modem Processor, which could be the modem side in a device like an OMAP730/850 device having both an apps processor and modem processor or a separate modem processor or other processor. It is the Modem Processor that eventually consumes the SIM personalization data. In such scenarios, it becomes necessary to have a protocol between the Modem processor and apps processor which can securely transfer the SIM personalization data to the Modem processor side.

This protocol can be also be used for secure transfer of other information (like IMEI) from the apps processor side to the Modem processor side. IMEI refers to International Mobile Equipment Identifier which identifies the mobile equipment unit.

The solution has 2 aspects

Protocol Aspects:

The SIM personalization data transfer protocol is based on a request response paradigm between the Modem Processor and the apps processor. The Modem side makes a request for the SIM personalization data, which passes through a Mailbox or other modem processor communications interface and goes to the apps processor side, where an application interfaces with the Secure Driver, which in turn loads a Protected Application (PA) to perform the specific request. The response is routed back along the same path. In essence, as secure mode is concerned, the Modem Processor software almost runs like an application on the apps processor side.

Security Aspects

1. Secure Tamper-proof Storage—the SIM personalization data is stored on the apps processor side using secure storage available in the apps processor side. This secure storage is protected by HW based security.

2. Authentication—The Modem side software authenticates the response (containing the SIM personalization data), which comes from the Apps processor side. This is done by programming a private key (protected by HW security) on the factory floor on the apps processor side and the corresponding Public Key (PK) on the Modem Processor software side. A random challenge protocol is run at every request, where the Modem processor sends a random challenge. This random challenge is concatenated to the response (SIM Personalization Data) and signed by the apps processor side. The Modem side software verifies the signed random challenge and SIM personalization data. Advantageously, Modem Software and the Public Key in the Modem Software are authenticated at boot time by the apps processor and are locked down (possible in OMAP7x0 processor combinations, and OMAP850 processor combinations) or periodically authenticated from the apps processor side (using the apps processor run-time security mechanisms). This also means that the Modem Software is accessible from the apps processor side (for reading only).

3. Confidentiality—If the response sent by the apps processor has to be confidential (this is preferable for the SIM personalization data), the Modem SW generates a Session Key and it encrypts the Session Key with the Public Key. The Session Key is subsequently decrypted with the Private Key on the apps processor side and the Session Key is then used to encrypt the SIM personalization data, which is sent to the Modem Processor. In cases where there is no hardware security or true random number generator on the Modem processor, code obfuscation techniques are suitably used to make the software tamper-resistant. Obfuscation is a software method wherein symbols and information are scrambled in place or dispersed throughout a file or files. All of this is done in such a way that an authorized user can recover the original symbols and information by an appropriate reverse procedure or algorithm. By contrast, an unauthorized user without the reverse procedure or algorithm is substantially impeded or prevented from recovering the original symbols and information.

The protocol above can also be used to transfer other information (like the IMEI (International Mobile Equipment Identifier), which is stored in the apps processor side in a device bound manner) from the apps processor side to the Modem Processor. In some cases (like IMEI), confidentiality may not be needed.

This fast, efficient, secure solution leverages present ROM code and HW based security mechanisms to store SIMLock Personalization data and protect IMEI and securely communicate them to the Modem Processor. SIMLock is a feature that limits a cell phone to operate with only certain SIM cards from particular providers. This is one of the most robust ways of meeting the GSMA requirements.

Glossary

| | |
|---|---|
| ADL | Auxiliary Download. A method used when flashing is done via IR or Bluetooth. |
| Memory Booting | ROM Code mechanism that consists of executing an Initial SW from external memory |
| Peripheral Booting | ROM Code mechanism that consists of polling selected interfaces, downloading and executing an Initial SW (in this case called Downloaded SW) in internal RAM. |
| IMEI | International Mobile Equipment Identifier. A global identification number in the GSM world. |
| Pre-Flashing | Pre-Flashing is a specific case of Peripheral Booting, when the ROM Code mechanism is used as part of a Flashing process to program external memories |
| Initial SW | SW which is executed by any of the ROM Code mechanisms (Memory Booting or Peripheral Booting). Initial SW is a generic term for Bootstrap and Downloaded SW |
| Bootstrap | Initial SW that is launched by the ROM Code during the Memory Booting phase. |
| Downloaded SW | Initial SW that is downloaded into internal SRAM by the ROM Code during Peripheral Booting phase |
| Flash Loader | Downloaded SW launched by the ROM Code in Pre-Flashing and which programs an image into external memories. |
| Certificate | Data block plus trusted signature of the data block. |
| Key Certificate | Certificate where the data block contains the PK's including a Public Key, Private Key pair for an asymmetric process. |
| R&D Certificate | Certificate where the data block contains development configuration parameters. |
| SW Certificate | Certificate where the data block contains the Software digest, which can be related to PPA, PA or Initial SW |
| PA | Protected Application. An application that is executed inside Secure Environment. |
| PPA | Primary Protected Application. Persistent Application present in Secure RAM after boot. |
| OEM | Original Equipment Manufacturer |
| SSL | Secure Sockets Layer Protocol-Cryptographic Protocol used to establish Session Keys |
| HMAC | Hashed Message Authentication Code |

Introduction

The OMAP™ family of processors from Texas Instruments Incorporated, Dallas, Tex. includes processors like the OMAP16xx, OMAP17xx, OMAP7x0, OMAP850, OMAP24xx families, etc. The OMAP16xx, OMAP17xx and OMAP24xx families are stand alone Applications (Apps) Processors but the OMAP7x0 and OMAP850 families are integrated Apps and Modem processors.

While the apps processor has hardware based security, many modem processors do not. However, the modem processor is usually the processor, which transmits the IMEI number and is also linked to the SIM card etc. Hence it becomes necessary to create a secure channel of communication between the Modem and Apps processor.

This document outlines such approaches to securing communication by using a simple message passing scheme between the two processors. In particular, this document outlines how the IMEI number can be verified on the Apps Processor side and be communicated to the Modem processor side, in a secure Manner. This secure communication channel can also be used for other purposes (like SIMLock etc).

Threat Models

This section outlines the various types of Apps Processor-Modem Processor combinations and outlines the various threats in each case.

1. Type 1—This includes a processor like OMAP16xx, OMAP17xx or OMAP24xx processor, which has hardware security and works in conjunction with a Modem Processor which does not have any hardware security. For such combinations, when the Modem side processor tries to fetch a verified IMEI number from the Apps Processor, an attacker scenario includes an attempt to hijack the software (which transmits the IMEI number) on the Apps processor side. If the Modem processor software is an address space, which can be accessed by the Apps processor side, an attacker scenario includes an attempt to also hijack the Modem processor software.

2. Type 2—This includes processors like OMAP7x0 and OMAP850 devices, where the Apps processor and Modem processor are integrated. The threat model is the same as the Type 1 combination 3. Type 3—This includes processors like OMAP16xx, and OMAP17xx devices with a processor which has some amount of hardware based security. The threat model is the same as the earlier types but the Modem software is probably not as vulnerable in this case as it can be secure through the hardware security in the modem processor.

4. Type 4—This includes processors like OMAP16xx, OMAP17xx, or OMAP24xx devices with a separate Modem processor. The threats are the same as Type 1.

Communication Protocol

Option 1

This section describes a communication protocol between the Modem Processor and Apps processor with the relevant security considerations. The assumption made here is that the Apps processor is the one which stores the IMEI, SIMLock details etc (using hardware based security) and the Modem processor requests information from the Apps processor side. The reason for doing so is that-for all types other than type 3 (and some instances of Type 4 if there are any), the Modem side cannot provide hardware based security and it becomes necessary to use the Apps processor's hardware based security.

For the type 3 combination, it is also possible to store all the information (like IMEI, SIMLock details etc) on the Modem processor side and leverage the Modem Processor's hardware security features.

Figure 3:
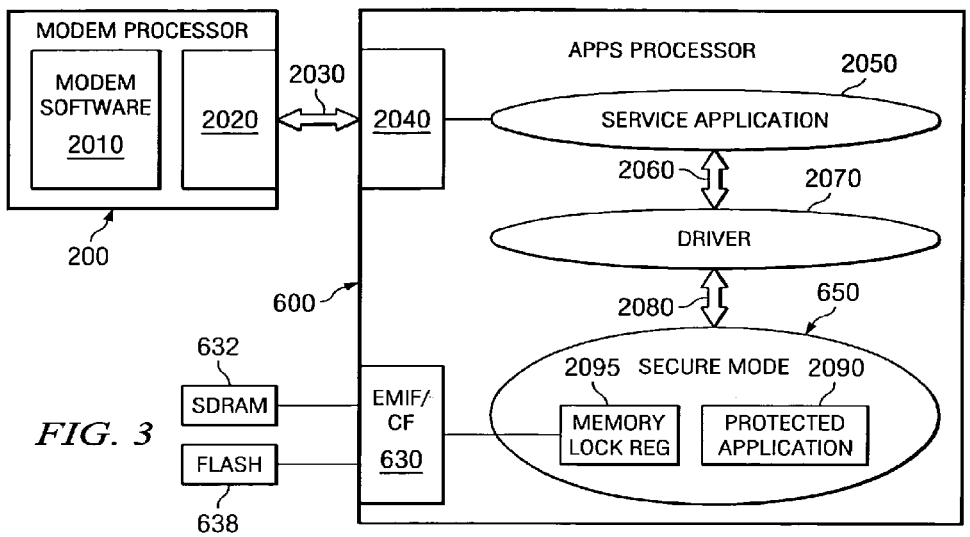
FIG. 3 is a block diagram of processors of FIGS. 2A and 2E with improved security processes for selectively operating a communications system for improved security.

Storing and validating (at boot time and run-time) the IMEI on the Apps processor use Protected Applications (PAs), which run in a hardware based Secure Execution Environment. The Protected Applications can be accessed through a software interface using a driver on the Apps Processor side. FIG. 3 shows how this can be extended into a paradigm for communication with the Modem processor. The flow happens in the steps as shown in FIG. 3.

1. The Modem side software, which needs the IMEI number (or other SIM information) requests for this information from the Apps processor side using a MailBox or other communications path between the processors. This request is passed on from the other end of the MailBox or other communications path to a service routine on the Apps processor side.

2. The service routine passes the request to a driver through an API call. The driver, also called the SE (Secure Environment) Device Driver is an OS specific driver.

3. The driver loads a Protected Application (PA), which executes in a hardware protected execution environment, and passes the request to the PA.

4. The PA does the necessary validation of the IMEI and sends the IMEI number (or any other requested information) to the driver 5. The driver passes this information to the service routine 6. The service routine passes this information to the Modem side software.

Security Considerations

1. The Driver, the Service routine need to be authenticated at boot-time and periodically at run-time. This can be done using the security mechanisms provided in the apps processor.

2 The modem side software needs to be authenticated at boot-time and periodically at run-time. This is possible only if the Modem side software is accessible by the Apps processor at boot-time and at run-time. On platforms like an OMAP7x0 or OMAP850 device, boot-time authentication of the Modem side software (using the Apps processor) is sufficient as it can be locked down in a write protect region after boot-time.

3. The modem side software has to trust that the IMEI information (or any other information) that it has requested for from the Apps processor side is authentic. This can be accomplished in an end-to-end manner as follows:

a) While flashing the phone, a per-device private-key, public-key pair is generated (or injected into the phone). The private key is stored in secure storage in a manner where it can be accessed by the IMEI PA. The public key is made a part of the Modem side software (part of the code) before it is signed and flashed.

b) As mentioned above, the Modem software is advantageously authenticated at boot-time and periodically at run-time. This ensures that the public key in the Modem side software is not tampered with (on OMAP7x0 and OMAP850 devices, the public key is locked down).

c) In the above protocol, in step 1, the Modem side SW sends a random challenge (which is carried over in steps 2,3 to the PA). In step 4, along with the requested information, the PA also sends a signature of the random challenge, IMEI and any other result information to the driver (The IMEI and result information is concatenated in a predetermined manner to the random challenge). This is passed in step 5 to the service routine and in step 6 to the Modem side software. The Modem side software verifies the Signature(s) using the Public key, which it was programmed with. The Modem side software verifies the random challenge. This verification mechanism is resistant to man-in-the-middle attacks, so long as the public key on the Modem side software is not tampered with. This again, as mentioned above needs b) to hold true.

Option 2

Figures 3A, 6:
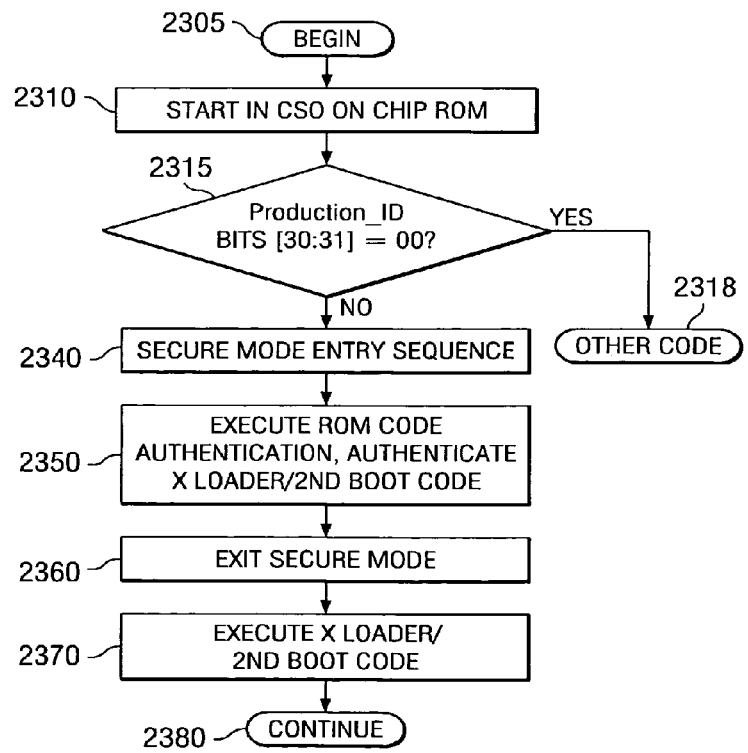
FIG. 3A is a diagram of identification (ID), certificates and hashes for an improved device bound certificate combination.
FIG. 6 is a flow diagram of a booting process for use in the systems, processors and processes of FIG. 5.

This section describes an enhancement to the DBC (Device Bound Certificate) scheme and provides a method for incorporating the Modem software code in the device bound certificate. The new DBC format is shown in FIG. 3A. The DBC is again created at flashing time. It incorporates the hash of the Modem SW certificate (which has been signed with the OEM key) in the DBC. There is suitably provided a separate asymmetric cryptographic communications process at flashing time wherein the Private Key of that asymmetric process is an OEM key held privately at OEM original equipment manufacturer, and the Public Key of that asymmetric process is manufactured into or sent down to apps processor and called a Root Public Key for verifying the device bound certificate DBC and thus software integrity at flashing time by apps processor. The private-key, public-key pair sent to target to provide secure communications between more-secure apps processor and less-secure apps processor is a different subject discussed elsewhere herein. In the flashing asymmetric process, the DBC is verified at boot time and apart from the verification of the IMEI cert, the Modem SW certificate is also verified. The DBC is stored in an area of flash accessible by the Modem Software. This DBC is also verified at two other instances:

1. Periodically at run-time

2. The DBC verification is initiated by the Modem SW every time it wants to use the IMEI number. It follows the same steps outlined in FIG. 1. Again the random challenge protocol should be used so that the response from the Apps processor side is not tampered with.

Again as mentioned earlier, in the case of OMAP7x0 and OMAP850 devices, once the DBC has been authenticated at boot time, if both the Modem SW and the DBC have been locked down using flash write protect, there is no need for run-time authentication. The boot time verification result has to be stored in the region of SDRAM, which is write protected.

Example Solutions—IMEI and SIMLock on OMAP7x0, OMAP850 devices

This section focuses on the solutions as applicable on an integrated Modem/Application processor devices such as the OMAP750 device and OMAP850 device, where the security features can be summarized as follows:

1. The Application Processor has a HW secure environment with secure RAM, public key information and random secret keys such as Derived Key(s) derived from a Device-Unique Secret Key as defined later hereinbelow, embedded in hardware and has the ability to execute protected applications (PAs). It is also equipped with a hardware random number generator.

2. The Modem processor does not have a HW secure environment, nor does it have a random number generator.

3. The Application Processor, when operating in the secure environment, can write-protect the modem side memory, so that no applicaion running on the application processor can modify the contents of the memory containing the modem side SW or data.

IMEI Protection

IMEI protection can easily be done using option 2 in the following steps.

1. While flashing the device, the DBC is created with the hash of the BootStrap and the Modem Software and the IMEI certificate and provided with a Signature as the encrypted hash value of BootStrap, Modem Software and IMEI certificate combined or multiple encrypted hash values from hashes of various parts of the foregoing. If needed the IMEI certificate can be obtained online 2. When the phone boots up, the boot time PA verifies the DBC and write protects the Modem SW code and the DBC. Note that the DBC and hence the IMEI is no longer in the FFS (Flash File System).

3. At run time, the Modem SW uses the IMEI directly from the DBC (note that there is no verification needed with the Apps processor as the Modem SW and the DBC containing the IMEI have been locked down).

4. The GSM edge data in SDRAM (Synchronous Dynamic Random Access Memory) is write protected from the MPU (done using GSM Protect). Apart from the above the GSM/EDGE (wireless protocol) FFS (Flash File System) backup in flash is encrypted and the Working set of the GSM FFS in SDRAM is write protected from the MPU (done using GSM Protect). This is all done through PAs.

SIMLock Protection.

For SIMLock, the personalization data including keys has to be protected against tampering and also needs to be confidential. The best way to do this is to use the secure mode on the MPU side to do this. The protocol can be implemented using option 1 as follows.

1. The Modem side software, which needs the personalization data requests this information from the Apps processor side using a MailBox or other communications path between the processors. This request (along with a random challenge) is passed on from the other end of the MailBox or other communications path to a service routine on the Apps processor side.

2. The service routine passes the request to a driver through an API (Application Peripheral Interface) call. The driver, also called the SE (Secure Environment) Device Driver is an OS (Operating System) specific driver.

3. The driver loads a Protected Application (PA), which executes in a hardware protected execution environment, and passes the request to the PA.

4. The PA does the necessary decryption of the personalization information (stored in secure storage). The PA signs the personalization information concatenated along with the random challenge (as described in Option 1) and sends it to the driver 5. The driver passes this information to the service routine 6. The service routine passes this information to the Modem side software 7. The Modem SW verifies the signature and the random challenge.

The above protocol further provides confidentiality of the personalization data when it is being transmitted outside Secure Mode. Here security is further improved by using a mechanism where the Modem SW generates a Session Key, such as a random symmetric key from a random seed (which is generated by the apps processor and stored in the Modem SW side) using an obfuscated key generation algorithm, encrypts the symmetric key with the Public Key (which has been locked down on the Modem Side SW as described in Option 1). Another method embodiment uses a combinatorial scheme of both code and data obfuscation, where the code and data (the key such as the Session Key in this case) are both obfuscated. Only the corresponding private key inside the Secure Mode on the apps side can decrypt this Symmetric Key. The decrypted Symmetric Key is used to encrypt the personalization data from the PA right up to the Modem SW. The Modem SW can then decrypt the personalization data using the Symmetric Key possessed by the modem processor. All this is under the assumption that there is no region of SDRAM which can actually be protected from an MPU read.

Note: In cases where the Modem processor has a HW secure environment and a random number generator, these are suitably used to improve confidentiality: the random symmetric key is then generated by the random number generator and used exclusively inside the Modem-side HW secure environment. If the Modem processor has a HW based secure environment, any other applicable symmetric or asymmetric key based protocols for authenticated and confidential data transfer are suitably used.

In the description above, "Write protected from the MPU" refers to the apps processor executing write protect operations in secure mode so that neither the apps processor 600 and the modem processor 200 can alter the write-protected information.

Note these particular types of symmetric keys and numbers to distinguish according to the teachings herein.

A Device-Unique Secret Key is a symmetric key, randomly generated and burned in an E-fuse on the chip during manufacturing. This device-unique secret key is the root of all, or an important basis of, confidentiality in the system.

A Derived Key is a symmetric key derived from the Device-Unique Secret Key. Many such Derived Keys can be derived during the lifetime of the device. A Derived Key is used to encrypt data to be placed in secure storage. ("Secure storage" is the process of encrypting data using such a key and saving it in a non-volatile memory.)

A Random Seed is a random number generated by the random number generator RNG in the more-secure processor at boot time and stored in the less-secure processor memory (e.g. modem processor memory) for future use. The modem processor can use this Random Seed to generate "challenges" using a pseudorandom number generator of the modem processor.

A Session Key is a random number generated by modem processor software, see "Security Aspects 3. Confidentiality" earlier hereinabove. A Session Key is a symmetric key used to establish a secure communication channel between the more-secure processor and the less-secure processor. The Session Key is communicated from the less-secure processor to the more-secure processor by encrypting the Session Key with the public key at the less-secure processor. The more-secure processor then uses the corresponding private key of the more-secure processor inside the secure environment of the more-secure processor to decrypt the encrypted Session Key. The more-secure apps processor then uses the Session Key to encrypt the personalization data and/or device identification data and/or other sensitive data before sending any one, some or all of the thus-encrypted sensitive data to the less-secure modem side.

Discussion now turns to an asymmetric cryptographic communications process used herein. A Private Key and a Public Key are provided as a private-key, public-key pair for use in the process. These keys are called asymmetric keys. The Private Key is kept secret. The Public Key can be held less-secure. In an asymmetric cryptographic process, a private key is used to decrypt what a public key has encrypted. This is called public key encryption. In the assymetric process, both the private key or public key can decrypt what the other key has encrypted—encrypt with one key, decrypt with the other key. Both keys can be kept secret and used to establish a confidential channel, but this result can be accomplished with symmetric keys also, at lower cost. Use of asymmetric cryptography herein is advantageous because one of the keys can be disclosed, and that key is called the Public Key. The Public Key can be used, for instance, in either or both of encryption and signatures. In encryption, the process encrypts with the Public Key and decrypts with the Private Key. Only the person who holds the Private Key can decrypt. By contrast, encrypting a message with the Private Key means that anyone who possesses the Public Key can decrypt the message. Signatures operate such that only the person who holds the Private Key can sign, and anyone holding the Public Key can verify. However, the Public Key used to verify the signature must be valid. Accordingly, the Public Key is provided in a certificate (see discussion of Device Bound Certificate DBC elsewhere herein) that is generated by a trusted source.

Next, a signing process is described. A signing process at a sending side for signing sensitive data such as device identification data and/or personalization data has steps of:
1—Hash the data at the sending side to get an original hash value Hash.
2—Encrypt the hash value Hash (not necessarily the data) with a private key at the sending side.

The encryption thwarts a man-in-the-middle attack that changes the data, computes a hash value HashX for that data and then cannot encrypt the hash value HashX because the man-in-the-middle lacks the private key securely possessed by the sending side with which to perform the encryption. The Signature is the encrypted hash value from the sending side. The Signature is transmitted from the sending side along with the data. The data is not necessarily encrypted but can be encrypted as well.

A verification process at a receiving side has steps of:
1—Hash the data at the receiving side to get a hash value Hash1.
2—Decrypt the Signature at the receiving side, meaning decrypt the encrypted hash value Hash received from the signing process, with the corresponding public key to get a hash value Hash2 at the receiving side that is presumably the same as the original hash value Hash from the signing process.
3—If Hash1=Hash2, the Signature is regarded as valid. This is because the receiving side has independently hashed the data to check for a discrepancy indicating a man-in-the-middle attack. The receiving side possesses the public key (that for purposes of the asymmetric process corresponds to but differs from the private key on the sending side) with which to decrypt the original hash value Hash. If Hash1 does not equal Hash2 then the communication received and purporting to be from the sending side is not regarded as valid. Either the Signature is not what was sent by the sending side or the data has been altered prior to reception or both. Either case is regarded as a signature-not-valid situation.

Among other embodiments, two alternative process embodiments for communication are described in connection with FIGS. 3, 4 and 5. They are summarized next.

Method 1 has the modem processor send a random challenge. Then the apps processor sends personalization data concatenated with random challenge received from modem, both in the clear, accompanied by a signature applicable to the combination of the personalization data and random challenge. Modem processor verifies the signature, checks that the received challenge from apps processor is the same as the one that was sent by modem processor, and if both verification and challenge are successful, modem processor uses the personalization data.

Method 2 has the modem send a random challenge accompanied by an encrypted Session Key generated by the modem processor and encrypted with Public Key possessed by modem processor. Apps processor decrypts the encrypted Session Key to recover the Session Key. Apps processor sends back the random challenge to modem processor in a data structure. Apps concatenates Personalization Data (the permissions portion) with the challenge and sign the whole thing. Apps processor encrypts personalization data with Session Key and sends the encrypted personalization data in the data structure too. The data structure is signed and thus accompanied by the Signature. Modem processor checks the random challenge reply, verifies the Signature, uses modem's own Session Key to decrypt the encrypted personalization data, and then modem processor uses the personalization data.

Method 2 Summary (authentication and confidentiality required):
Apps Processor sends:
1—Personalization data encrypted with Session Key
2—Challenge received from modem processor
3—Signature applicable to combination of 1 and 2
Modem Processor then does the following:
1—Verifies signature
2—Checks that the received challenge is the one that was sent
3—If both steps 1 and 2 are successful, modem processor decrypts personalization data with symmmetric key and uses the personalization data. Otherwise, do not use.

Method 3: Same as Method 2 except the encrypted Session Key does double duty as both itself and as the random challenge. The random challenge is constituted by the encrypted Session Key. The random challenge is not only decrypted to obtain the Session Key for encrypting the personalization data, but also the random challenge is sent back by apps processor to modem processor in the form received from modem processor.

Description now turns specifically to the further Figures.

In FIG. 3, modem processor 200 has modem software 2010 such as cellular, WLAN, wireline or other modem software. Modem processor 200 two-way communicates with applications (apps) processor 600 using a mailbox register 2020 in modem processor 200, over communications path 2030, and using a mailbox register 2040 in apps processor 200. A mailbox structure herein includes, for example, hardware registers 2020 and 2040, access by each processor into the processors register space, and interrupt service routines in each processor for servicing the accesses. For example, communications path 2030 is suitably provided by the path signified by Arrow "B" in FIGS. 2A and 2E.

The mailbox approach is particularly useful for integrated circuits having the modem processor 200 and the apps processor 600 on the same chip as in threat Type 2 listed hereinabove. Other communications paths suitable for various architectures having one chip or multiple chips include interrupt-based communications through interrupt control registers, and serial communications through MCSI multi-channel serial interface or UART or McBSP multi-channel buffered serial port.

When either processor 200 or 600 sends a message to the other processor mailbox 2040 or 2020 as destination, the message is stored in the destination mailbox register 2040 or 2020 and an interrupt is generated in the destination processor 600 or 200. The interrupt signals the destination processor to execute an interrupt service routine to process the message that has been sent to the destination mailbox register. Further examples of information sent each way between modem processor 200 and apps processor 600 are described in connection with FIG. 4 later hereinbelow.

Further in FIG. 3, a service application 2050 includes an interrupt service routine for servicing the mailbox 2050 in apps processor 600. Service routine 2050 two-way communicates via a path 2060 with an operating system driver 2070. The driver 2070 two-way communicates via a path 2080 with secure mode hardware 650 and Protected Application software 2090 associated with hardware 650.

The service routine is, for instance, a combination of an interrupt service routine and a low level driver (sometimes called a physical driver). The interrupt service routine is used to identify the command request from the modem processor 200 to application processor 600. The low level driver is used to receive and transmit IMEI device identification and SIM-Lock subscriber identification data to and from the modem interface to the secure environment (SE) Driver that is the high level operating system (HLOS) driver) 2070.

At boot up, apps processor 600 authenticates its software and data such as in SDRAM 632 and/or Flash memory 638, and via EMIF/CF block 630. Apps processor 600 then sets a Memory Lock register 2095 to lock down the authenticated software and data by making the memory spaces write-protected in which they reside.

In FIG. 3A, a Device Bound Certificate (DBC) carries information in secure form for manufacturing the system components of FIG. 1 and originally loading, testing and running each system component 110, 110', 150, 160, 180, 190. The process of manufacture is described further in connection with FIG. 9 elsewhere herein. The DBC includes a Public Chip ID identifying the chip. This Public Chip ID is public identification information derived from but not necessarily identical to the Device-Unique Secret Key for the chip. The Creator ID identifies the manufacturer such as an original equipment manufacturer (OEM). The Application ID identifies the application. Next in the DBC is a hash of the bootstrap code and software certificate. Further provided is a hash of the modem software and software certificate. The DBC includes an IMEI certificate, such as an encrypted IMEI for a cellular telephone handset. An HMAC hash message authentication code further protects the device bound certificate DBC.

Figure 4:
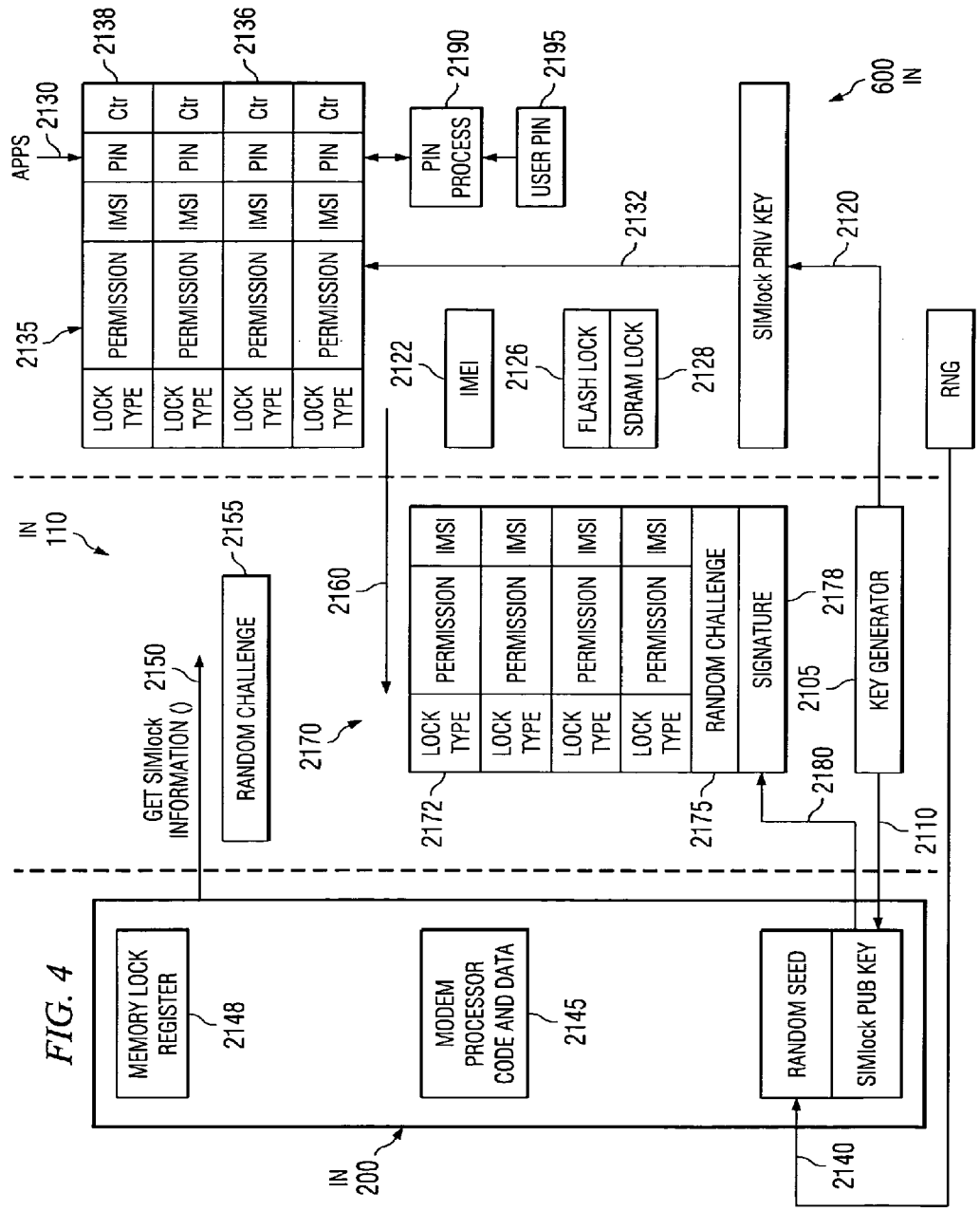
FIG. 4 is a more detailed system and process diagram of a process of improved security for operating a communications system using the processors of FIGS. 2A and 2E.

In FIG. 4, the diagram is divided into three parts. At left, relevant portions of the modem code reside in or are associated with modem processor 200. At right, an applications (apps) processor 600 has security block 650 and apps processor code resident in or associated with the apps processor. Information, as shown in the middle of FIG. 4, is communicated back and forth between modem 200 and apps processor 600. The information and processes of FIG. 4 further detail the structures and processes of FIG. 3.

In FIG. 4, a SIM locking ("SIMlock" herein) Public Key for encryption/decryption is generated by a key generator 2105 in a step 2110 for the modem processor 200 by inserting that SIMlock Public Key into and storing it as part of the boot image loaded into the modem processor 200 at the factory which makes the modem processor 200. The SIMlock Public Key is any suitable public key. In one form, the SIMlock Public Key has the further feature of being unique to the modem processor 200 device. The SIMlock Public Key is either stored in flash or in the modem processor 200 as the skilled worker selects in accordance with practical considerations. The Simlock Public Key is authenticated at boot up of the modem processor 200.

Also, in a step 2120, a SIMlock Private Key corresponding to the SIMlock Public Key is stored in hardware-protected secure space 650 of the apps processor 600. Suitable hardware protection is provided by a secure state machine 2260 of FIG. 5 for instance. Hardware protection is also accomplished using the secure storage mechanism by encrypting data with the Derived Key derived from the Device-Unique Secret Key and storing it in either public memory or secure RAM, or internal or external writable non-volatile memory whether or not secure, or storing the data in portions allocated to any one or more of public memory, secure RAM and writable non-volatile memory. This latter form of hardware protection can still be seen as "hardware protected memory" but differs from the approach solely using secure RAM or ROM. Further in FIG. 4, the SIMlock Private Key is not shared with the modem processor 200 in this embodiment, wherein the SIMlock Private Key is used in the apps processor 600 only and in the secure mode of the apps processor 600 only.

An IMEI device identification 2122 is also stored in hardware-protected secure space 650 of the apps processor 600. Also in the secure space 650 is a Security Control Register SECCTRL, which has Flash Memory Lock bits 2126 for particular storage spaces and/or entire memories and analogous SDRAM lock bits 2128 for particular storage spaces and/or entire memories.

Further, in a step 2130, a SIMlock file 2135 is initially stored in the apps processor 600 secure memory space and encrypted by the SIMlock Private Key in a step 2132. Alternatively, in step 2130, a SIMlock file 2135 is initially stored in the apps processor 600 secure storage and suitably encrypted by a Symmetric Key derived from the Device-Unique Secret Key in a step 2132. In either case, hardware protection is also accomplished using the secure storage mechanism by storing the encrypted SIMlock file 2135 in either public memory or secure RAM or internal or external writable non-volatile memory whether or not secure, or storing the data in portions allocated to any one or more of public memory, secure RAM and writable non-volatile memory.

The SIMlock file 2135 is changed or modified only in secure mode of the apps processor 600 by a security module 2190 accessible by user interface 2195 for PIN (personal identification number) entry. Access is permitted only if a PIN authorized for the apps processor 600 is provided.

The SIMlock file 2135 is a table of row entries. Each row has entries for Lock Type, Permission, IMSI (International Mobile Subscriber Information), a PIN and a Counter value. Lock Type represents respective ways to lock access by world region, country, network operator, and other defined modes of scope of access. Permission represents whether the particular Lock Type is 100% accessible with all features, not accessible at all (zero 0% features) to the user, or which features of the mobile phone are available to user when fewer than all features of the mobile phone are available. IMSI provides subscriber information pertinent to each user who is permitted to use the mobile phone through the user's possession and insertion of a SIM card into the mobile phone handset 110 to activate the handset 110 of FIG. 1.

In FIG. 4, respective row counters Ctr 2138 automatically record and keep a record in SIMlock file 2135 of how many times the entries of each given row have been changed by use of the PIN and entry of new information. Diagnostic software suitably determines if an unusual number or pattern of entry-changes have occurred.

Next in FIG. 4, the modem processor 200 and the apps processor 600 are booted. In a step 2140, a random seed is generated by a high-quality random number generator (RNG) in security block 650 of apps processor 600 and supplied to modem processor 200.

In one category of embodiment, the modem processor 200 software is tamper-proof and the apps processor 600 has a higher level of security such as providing a hardware-protected secure mode of operation as in FIG. 5.

Further in FIG. 4, at boot up, the modem processor 200 software code and data are authenticated. Also, the apps processor 600 software code and data are authenticated. The objective is to foreclose and prevent the possibility of unauthorized software being introduced and used to obtain access to features which are not permitted for a given user.

Any suitable authentication process is used at boot up of each processor 200 and 600. For example, hashing the modem processor 200 software code and data 2145 at boot up and comparing a hash value with a pre-computed hash value pre-stored in the boot image is one method of authentication. Obfuscation of the modem processor 200 software code and/or data is suitably used as a security measure alone or together with other security measures in the modem processor 200.

Authentication is suitably performed not only at boot time, but also periodically and/or non-periodically after boot time.

Further, the modem processor 200 code and data are locked at boot time. For example, each memory and/or memory space holding authenticated modem code and data is locked in secure mode by setting Flash Lock bits 2126 and SDRAM Lock bits 2128 in apps processor 600 to a locked state. The secure state machine 138 of FIG. 1, and FIG. 2E prevents writes to the locked storage spaces and thereby provides hardware-based protection to the locked storage spaces and to the Security Control Register and its lock bits 2126 and 2128. Modem processor 200 and apps processor 600 are able to read the locked storage spaces.

Alternatively or in addition, a Memory Lock Register 2148 is suitably provided in modem processor 200. The modem processor 200 has Memory Lock Register 2148 controlled by transferred and authenticated bits from the Flash Lock bits 2126 and SDRAM Lock bits 2128 from apps processor 600, for example. In the locked state, an MMU (memory management unit or Memory Controller of FIG. 2A) or similar circuitry of modem processor 200 is made write-protected so that writes to such memory and/or memory space are disabled. Such memories include SDRAM (e.g., synchronous dynamic random access memory of DDR double data rate and other varieties), Flash memory, and other memories and memory spaces on and off-chip.

Advantageously, the authentication and locking processes described for the modem processor 200 hereinabove prevent security attacks of various types. If a memory is tampered with (e.g., alteration of contents, physical replacement, or adding or removing memory) prior to boot time, then the hash at boot up, computed by modem processor 200 on the modem code and data, will not equal the pre-stored hash value in the boot image of modem processor 200. If a memory is tampered with after boot time, then the hash in one or more post-boot security checks will not equal the pre-stored hash value in the boot image of the processor, such as 200, which checks that memory. If equality is found, normal operation is resumed and continues. If equality fails, then software and hardware of modem processor 200 are activated or bypassed as necessary to take appropriate measures such as warning message on user display, retry, disablement of wireless communication such as preventing a requested phone call, activation or initiation of an automatic call to enterprise security center and/or IT support center, and/or system reset.

If the authentication process is unable to authenticate the modem processor software, then the modem processor 200 is returned to a reset state. If the modem processor 200 software is successfully authenticated, then operations proceed to a step 2150.

In this embodiment, authentication by apps processor 600 is described the same as in the above four paragraphs as for modem processor 200. The analogous description is omitted for conciseness.

In step 2150, the modem processor 200 sends a random challenge 2155 to the apps processor 600. The modem processor 200 is, in effect, requiring apps processor 600 by means of the challenge 2155 to prove that the device that constitutes apps processor 600 is in fact the one particular authorized apps processor device with which modem processor 200 is permitted to communicate.

To generate the challenge 2155, modem processor 200 code suitably runs a pseudo-random number generator that starts the process of generating a pseudo-random number symmetric key useful as a Session Key based on the Random Seed provided by the apps processor 600 in step 2140. The Session Key is based on some type of shared secret, in this case the Random Seed. In this way, the modem processor 200 provides a challenge 2155 that is generated sequentially starting from the Random Seed of step 2140. If the modem processor 200 has a high quality random number generator (RNG), then that RNG is suitably used. However, some types of modems have a lower level of security and a pseudo-random number generator is adequate for generating the random or pseudo-random number that is sent from modem 200 for purposes of the random challenge to the apps processor 600. Alternatively, a time-stamp from the modem 200 is sent as the challenge number.

The challenge step 2150 further advantageously thwarts replay attacks wherein an earlier instance of communication from the apps processor 600 is unauthorizedly intercepted and then sent in replayed or repeated form into the modem 200 at a later time, to somehow take advantage of the features of the modem 200 or to overload modem 200. Replay attacks are thwarted because the modem processor 200 at the later time will only respond to a different form of the communication from apps processor 600 than had occurred at the earlier time. This varying different form is described further hereinbelow.

A communications step 2160 now occurs wherein the apps processor 600 responds to the random challenge 2155. Apps processor 600 sends a file structure 2170 that has several parts. First, a predetermined portion 2172 from SIMlock file 2135 provides, for example, all rows of Lock Type, Permission, and IMSI. PINS from SIMlock file 2135 remain stored in secure space occupied by SIMlock file 2135 in apps processor 600 and are not transmitted to the modem 200 processor in this embodiment.

Additionally, the file structure 2170 communicated by apps processor 600 in step 2160 includes a reply field 2175 which, in one example, replicates random challenge 2155 earlier sent to apps processor 600 in step 2155. In applications where it is desired to avoid duplicating the random challenge received by the apps processor 600 in the reply by the apps processor 600, then the random challenge is suitably encrypted with by the apps processor in any suitable way that can be decrypted by the modem processor 200.

If the returned random challenge 2175 of step 2160 matches the sent random challenge 2155 of step 2150, then the challenge has been fulfilled by apps processor 600 and modem processor 200 confirms this event by verification of the match.

File structure 2170 further includes a Signature 2178. Apps processor 600 suitably generates the Signature 2178 in any appropriate secure manner such as by first performing a hash of the combination of the SIMlock file portion 2172 combined with the random challenge field 2175. Then, second, the resulting hash value H600 is encrypted with the SIMlock Private Key that was provided to apps processor 600 in step 2120. Hash value H600 is thus encrypted with the SIMlock Private Key to constitute Signature 2178 and, the Signature 2178 is sent with the file structure 2170 to the modem processor 200.

Further in FIG. 4, a step 2180 is performed by modem 200. Step 2180 verifies the integrity of the file structure 2170 sent by apps processor 600 to modem 200. Step 2180 verifies integrity of file structure 2170 using the random challenge information in field 2175 as discussed above as well as by using the SIMlock Public Key (PUB KEY) which was stored by apps processor 600 in modem 200 in step 2110. Step 2180 also decrypts the Signature 2178 using the SIMlock Public Key to recover the hash value H600 that was encrypted into the Signature 2178.

An asymmetric encryption/decryption process is used so that encryption occurs in apps processor 600 using the SIMlock Private Key and decryption is successfully completed using the SIMlock Public Key (PUB KEY).

Then Modem 200 itself independently hashes the combination of file portion 2172 and random challenge field 2175 to produce a hash value H200 by modem 200 independently of the hash value H600 that was computed by apps processor 600 earlier and that H600 was sent encrypted in the Signature 2178. The hash value H600 recovered from Signature 2178 is compared with hash value H200 independently computed by modem 200 on the received material including file portion 2172 and random challenge 2175 combined.

If and when modem processor 200 determines that hash value H600 equals and is the same as hash value H200, then integrity of file structure 2170 is confirmed. The Lock Type, Permission, and IMSI data are thereupon used by modem processor 200 to activate features and enable access to communications in accordance with the Lock Type and Permission information in file portion 2172. This activation pertains only to the user when the user has provided and inserted a SIM card 295 of FIG. 2A into the handset which identifies and confirms the user as authorized, provided modem processor 200 verifies by successful match or other comparison of data from the SIM card with the IMSI data.

If hash value H600 does not equal or is not identical with hash value H200, then file structure 2170 lacks integrity or has an unconfirmed level of integrity. In such case, software in modem processor 200 is suitably coded and executed to repeat the steps 2150 and 2180. Step 2150 causes another response step 2160 from apps processor 600 to send another file structure 2170 for verification by modem processor 200 in step 2180. Unless the verification is successful within a small number of repeated attempts (e.g., one or two), the modem processor 200 and apps processor 600 are forced to reset. Alternatively, the software in modem processor 200 is coded to force an immediate reset without any repeat attempt at all.

Software and hardware are activated or bypassed at challenge-checking and hash value-checking 2180 time to take appropriate measures. Such measures include warning message on user display, retry, disablement of wireless communication such as preventing a requested phone call, activation or initiation of an automatic call to enterprise security center and/or IT support center, and/or system reset.

Unauthorized activity might attempt to directly introduce or inject a bogus file structure 2170 into modem processor 200, bypassing step 2180 and thereby to cause modem processor 200 to respond to the bogus file structure to obtain unauthorized accesses and features. Such unauthorized activity is thwarted because software alteration of the software executed by modem processor 200 is required to bypass the step 2180 decryption and equality checks established and described. Such software alteration requires tampering which is detected or prevented by the authentication and/or locking features established and described earlier hereinabove wherein modem processor 200 code and data are authenticated and locked at boot time and authenticated at intervals after boot time. In other words, the hash of the modem processor 200 software and data fails to pass the hash checking at and/or after boot time when such unauthorized activity occurs. Software and hardware are activated or bypassed as necessary to take appropriate measures such as warning message on user display, retry, disablement of wireless communication such as preventing a requested phone call, activation or initiation of an automatic call to enterprise security center and/or IT support center, and/or system reset.

In security module 2190, a secure software program is provided by which an authorized user is provided with a Personal Identification Number (PIN) 2195 which matches the PIN stored for that IMSI user SIM card 295 (FIG. 2A) in a row 2136 of Simlock file 2135 of FIG. 4. Provided that the SIM card 295 provided and inserted by user supplies data PIN 2195 matching the IMSI user data in row of 2136 of SIMlock file 2135, and further provided that the PIN entered by user matches the stored PIN in row 2136 of SIMlock file 2135, then user is further permitted to modify one or more of the fields of Lock Type, Permission, IMSI, PIN and Counter Ctr. If the foregoing proviso conditions are not all met, then the user is denied the modification code and disabled from making any modifications, and the system takes appropriate measures such as warning messages, retry, branch to ordinary use of the handset, automatic call to enterprise security center, and/or system reset.

Similar PIN arrangements or additional PINS and software to respond to such PINS are suitably included in or associated with apps processor 600 to enable an authorized administrator and/or supervisory authorized person to alter the SIMlock file for additional fields and users other than themselves. In this way personalization to restrict the scope of permitted accesses, features and users is permitted. Conversely, the PIN arrangements support de-personalization to expand the scope of permitted accesses, features and users.

In various embodiments, the security features described here are applied to
  A. Mobile phones having a less-secure but tamper-resistant processor on a different chip from a more secure processor with hardware security features.
  B. Mobile phones having a less-secure but tamper-resistant processor on the same chip as a more secure processor with hardware security features.
  C. Mobile phones having two processors each on different chip and both having a very secure processor with hardware security features.
  D. Mobile phones having two processors each on the same chip and both having a very secure processor with hardware security features.
  E. Mobile phones of varieties A, B, C, D above wherein the data is SIM (subscriber identification module) data
  F. Mobile phones of varieties A, B, C, D above wherein the data is DRM (digital rights management) data or any other data which needs to be maintained in a secure manner.
  G. Mobile phones with WLAN (wireless local area network, e.g. 802.11, etc.) modem and/or wireless cellular or packet voice/data modem in the mobile phone.
  H. Personal computers, laptop computers, handheld computers, and other portable computers in public places such as kiosks and in enterprise and other private locations wherein user identification data, digital rights management data, and/or any other data needs to be maintained in a secure manner and wherein one processor communicates locally or remotely with another processor.
  I. DSL (digital subscriber line) and/or WLAN routers and gateways in stand alone gateway configurations and/or computer units.
  J. Wireless base stations.
  K. Any application where two or more at least partially secure processors need to handle identification data, rights data, and other data in a secure manner.

The improvements described herein are applicable to processors of many manufacturers.

ME personalization is the process of storing information in the ME and activating the procedures which verify this information against the corresponding information stored in the SIM/USIM whenever the ME is powered up or a SIM/USIM is inserted, in order to limit the SIM/USIMs with which the ME will operate.

Five personalization categories of varying granularity include: Network, Network subset, Service Provider, Corporate, and SIM/USIM.

The personalization categories are independent in so far as each category can be activated or de-activated regardless of the status of the others. Each category has a separate personalization indicator to show whether it is active or not. The ME can be personalized to one network, one network subset, one SP, one Corporate, one SIM/USIM or any combination thereof. The ME may optionally be personalized to multiple networks, network subsets, SPs, Corporates, IMs or any combinations thereof Each of the personalization categories uses thus three types of information (referred further as the ME personalization information) which are securely stored in the ME: 1) one or more personalization codes that will be checked against the information stored on the inserted SIM/USIM card, 2) an indicator to show whether it is active or not, and 3) a key used as the password for its de-activation.

All those information items are protected from tampering/modification. Additionally the de-personalization keys are unique for different devices (e.g., per-device bound Derived Keys). Hardware-based security binds the IMEI device identification to the physical device. The de-personalization keys are prepared by a process based on particular device identifications to make the de-personalization keys per-device bound.

Various threats to the ME Personalization Information include Threat 1—Tampering of ME personalization Data. If the ME Personalization data is tampered with, then any SIM/USIM could be inserted and the phone could connect to any network, service provider etc. Threat 2—Flash Replacement Attacks. If the ME Personalization data is stored in Flash Memory and the whole Flash Memory part is replaced, the ME Personalization data is indirectly tampered with. Thus the ME personalization data is desirably made device bound.

The processes and methods described herein advantageously address various threats.

Type 1 and Type 4 Devices—ME protection Using a Generic Communication Protocol

The Modem side software, which needs the ME Personalization Information requests for this information from the Apps processor side using a MailBox between the processors. This request is passed on from the other end of the MailBox to a service routine on the Apps processor side. The Apps Processor stores the ME personalization information in the form of a ME personalization certificate (which contains the necessary ME personalization data and status flags has been signed with the OEM/key or any other similar key)

The PA does the necessary validation of the ME personalization Certificate (MEPC, similar to the IMEI certificate described in FIG. 3A) and sends the relevant ME personalization data MEPD)(like status indicator) to the driver. If the ME personalization certificate MEPC cannot be validated. Note that the MEPC is also device bound.

De-Personalization of the ME Personalization data is performed at the Apps processor and the changes are executed inside Secure Mode. De-personalization is prevented from being performed other than by the apps processor and prevented outside of secure mode.

Figure 9:
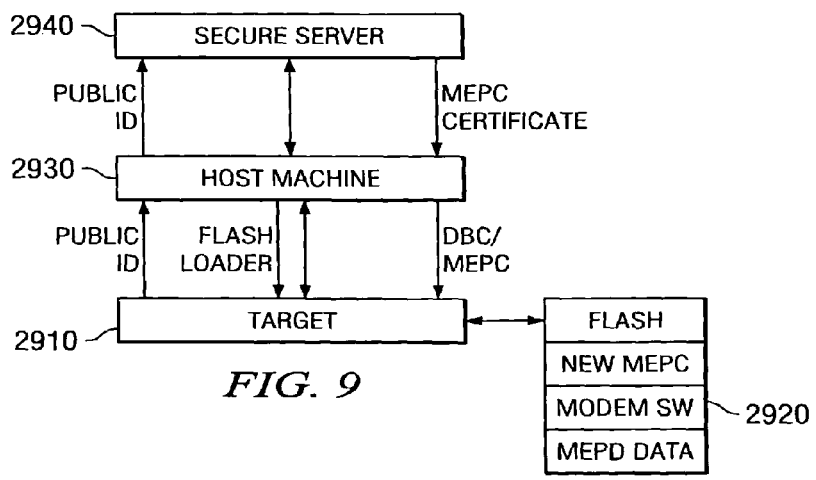
FIG. 9 is a block diagram of a system and process of manufacture of target devices such as cell phones using the device bound certificate of FIG. 3A.

For the type of devices with integrated apps and modem processor, the communication protocol is slightly simplified. The steps to security are described in the following two process embodiments. The target, host machine and secure server of FIG. 9 are suitably provided.

Integrated Apps/Modem: Security Process 1
1. Flashing:
  a) The target sends out the Public ID to the Host Machine
  b) The Host Machine embeds the Public ID to the Secure Server over a secure tunnel (channel).
  c) Simultaneously, the Host Machine also sends the Flash Loader down to the target.
  d) The secure server generates the ME personalization certificate (MEPC) signed with the OEM public key and that is sent down to the host machine and then to the target.

e) The Flash Loader uses a PA to verify the MEPC and removes the signature on the MEPC and replaces it with a new (modified) MEPC, which is both encrypted and HMACed with a Derived Key such as a symmetric key derived from the Device-Unique Secret Key and stores this in flash. In some embodiments, only the depersonalization key portion is encrypted.

f) The Flash Loader in step 2105 of FIG. 4 also generates a Private Key, Public Key pair (using a PA). The Private Key is stored in step 2120 inside secure mode (if secure storage is not available, it is stored encrypted using a Derived Key derived from Device-Unique Secret Key) and the Public Key is made a part of the Modem Software (SW) (GSM/GPRS/EDGE WCDMA/UMTS or other suitable modem Code). One or more Derived Keys and other keys are suitably stored in secure mode hardware-protected locked storage, or in originally-manufactured ROM, or in write-once storage such as E-Fuse, and appropriately protected by the security state machine 2260.

g) The Flash loader also loads the Modem SW (with the corresponding Public Key) into Flash Memory and locks them using GSM Flash Protect.

h) The Flash Loader also creates a data structure 2130 called the ME personalization data (MEPD, which is in clear-text and contains all public information but not the Derived Key depersonalization keys) and signs the MEPD with a Signature hash value encrypted with the Private Key from step 2120 stored inside Secure Mode and loads it into flash memory.

2. Booting and Run-Time:

a) While booting, the BootStrap uses its PA to authenticate the Modem SW Code segment and the new (modified) MEPC certificate (by decrypting and computing the HMAC using a Derived Key derived from the Device-Unique Secret Key). The PA again signs the MEPD data and stores it in flash (this signing step may be omitted) along with the Random Seed generated by the high-quality random number generator and the Modem SW is released from reset and executed.

b) At run-time all changes to the ME personalization data MEPD, which happen either through a user interface 2190 of FIG. 4 or through an auto-lock triggered mechanism are dealt with on the Apps Processor side in the following two steps:

i) Using an OS driver which loads a Protected Application, the MEPC certificate (which is encrypted and HMACed) inside Secure Mode is updated and a new HMAC is computed and the data is encrypted again.

ii) The MEPD data (with the public information, some of which may be new) is again re-signed with a Signature such as hash value encrypted by the Private Key inside Secure Mode and is saved in Flash Memory.

3. Modem Side.

a) The Modem SW is prevented from tampering because of the Flash Write Protect mechanism. Whenever the Modem SW wants to use the ME personalization data MEPD, it issues a challenge and verifies the signature on the response coming from the Apps SW before using the MEPD. See FIG. 4.

b) The Modem side SW also sends any relevant triggers to the Apps Processor (example auto-lock trigger AT). This may be done using an AT command interface.

Integrated Apps/Modem: Security Process 2

This process is suitably used if there is no OS driver 2070 available.

1. Flashing: (same steps as in process 1 Flashing)
2. Booting and Run-Time:

a) While booting, the BootStrap uses its PA to authenticate the Modem SW Code segment and the new (modified) MEPC (by decrypting and computing the HMAC using a Derived Key derived from the Device-Unique Secret Key). Flash loader again signs the MEPD and stores it in flash along with a random number seed generated by the high-quality random number generator and the Modem SW Code is released from reset.

b) At run-time all changes to the ME personalization data MEPD, which happen either through a user interface 2190 of FIG. 4 or through an auto-lock triggered (AT) mechanism are dealt with by storing them either encrypted by the Private Key or the new data in permanent secure storage and then forcing a reboot of the system. This is suitably enhanced even more by encrypting the stored value with the Public Key from the Modem side. The Private key on the Apps Processor side is suitably used to decrypt the values inside Secure Mode when the device reboots.

i) When the system reboots, the Boot Strap reads the saved value (of either the Private Key or the Personalization data MEPD from permanent storage) and the MEPC is modified (inside Secure Mode) and the MEPC certificate is again re-signed with the new values.

3. Modem Side. (Same Steps as Security Process 1).

FIG. 5 illustrates an advantageous form of software modes and architecture 2200 for the secure apps processor 600. Encrypted secure storage 2210 and a file system 2220 provide storage for this arrangement. Selected contents or all contents of encrypted secure storage 2210 are further stored in a secure storage area 2225.

Next a secure mode area of the architecture is described. In a ROM area of the architecture 2200, secure ROM code 2240 together with secure data such as Device-Unique Secret Key and other cryptographic key data are manufactured into an integrated circuit including processor circuitry. Also a secure RAM 2245 is provided. Secret data such as key data is copied or provided into secure RAM 2245 as a result of processing of the Secure ROM Code 2240. Further in the secure mode area are modules for Root Public Key, Random Key module such as for Device-Unique Secret Key and producing Derived Key(s), RNG (Random Number Generator), SHA-1/MD5 hashing software and processes, DES/3DES (Data Encryption Standard single and triple-DES) software and processes, AES (Advanced Encryption Standard) software and processes, and PKA (Private Key Authentication) software and processes.

A hardware-implemented secure state machine 2260 monitors the buses, registers, circuitry and operations of the secure mode area of the architecture 2200. In this way, addresses, bits, circuitry inputs and outputs and operations and sequences of operations that violate predetermined secure standards of operation of the secure mode area are detected. The secure state machine 2260 then provides any or all of warning, denial of access to a space, forcing of reset and other protective measures. Use of independent on-chip hardware for secure state machine 2260 advantageously isolates its operations from software-based attacks.

An addressable secure control register (SECCTRL) 2265 with some bits as tabulated in TABLE 1 is provided in secure space.

TABLE 1

SECURE CONTROL REGISTER BIT/FUNCTION
SECCTRL Bit/Function

MPU JTAG serial scan testing enable control register.

1: MPU JTAG is enabled
0: MPU JTAG is disabled
SHA-1 hashing module access control register.

0: SHA-1 module access in non-secure mode and secure mode is enabled
1: SHA-1 module access in secure mode only is enabled
DES/3DES encryption module access control register.

0: DES/3DES module access in non-secure mode and secure mode is enabled.
1: DES/3DES module access in secure mode only is enabled.
RNG true random number generator module access control register.

0: RNG module access in non-secure mode and secure mode is enabled.
1: RNG module access in secure mode only is enabled.
FLASH LOCK SPACE 1

Lock = prevent write access 0: no lock 1: lock
FLASH LOCK SPACE i . . .

Lock = prevent write access 0: no lock 1: lock
FLASH LOCK SPACE N

Lock = prevent write access 0: no lock 1: lock
SDRAM LOCK SPACE 1

Lock = prevent write access 0: no lock 1: lock
SDRAM LOCK SPACE i . . .

Lock = prevent write access 0: no lock 1: lock
SDRAM LOCK SPACE N

Lock = prevent write access 0: no lock 1: lock

Secure state machine 2260 monitors busses and other hardware blocks, pin boundary and other parts of the chip for security violations and protects and isolates the protected areas. Secure state machine 2260 makes secure ROM space inaccessible, Security Control Register SECCTRL 2265 inaccessible, and secure RAM space inaccessible and establishes any other appropriate protections to additionally foster security. In one embodiment such a software jump from flash to secure ROM, for instance, causes a security violation wherein, for example, the secure state machine produces an automatic immediate reset of the chip. In another embodiment, such a jump causes the security monitoring logic to produce an error message and a re-vectoring of the jump away from secure ROM. Other security violations would include attempted access to Security Control Register SECCTRL 2265 or attempted access to secure RAM space.

In FIG. 5, a kernel mode part of the software architecture includes one or more secure environment device drivers 2270. Driver 2070 of FIG. 3 suitably is provided as a secure environment device driver in kernel mode.

Further in FIG. 5, a user application 2280 communicates to and through a secure environment API (application peripheral interface) software module 2290 to the secure environment device driver 2270. Both the user app 2280 and API 2290 are in a user mode part of the software architecture.

A protected application 2090 provides an interface between user application 2280 and information in file system 2220, secure storage 2225, and a trusted library 2295 such as an authenticated library of software for the system.

Turning to FIG. 6, secure booting and flashing operations in apps processor 600 commence with a BEGIN 2305 and proceed to boot beginning with a step 2310 that starts in a CS0 (chip select zero) memory space in on-chip ROM. Next, a step 2315 checks eFuse bits called Production ID bits. If these Production ID bits have a predetermined value such as 00, operations branch to Other Code step 2318. Otherwise, operations go to a Secure Boot sequence 2320.

Next, a succeeding step 2340 commences a secure mode entry sequence. In FIG. 6, a secure mode entry sequence 2340 of instructions and/or data is established. The security state monitor logic 2260 is arranged in its hardware monitoring function correspondingly to detect whatever that Secure mode entry sequence of instructions and/or data has been established to be. The secure mode is entered at step 2340 by secure ROM code execution of the Secure mode entry sequence of instructions and/or data. The Security state monitor 2260 checks the Secure mode entry sequence of instructions and/or data. Since this Secure mode entry sequence of instructions and/or data has been pre-programmed by manufacturer in the correct authorized manner, the ROM code enters secure mode. No user application operates at this time because secure code is executed, not user application code.

A further step 2350 executes ROM code authentication and authenticates XLoader/$2^{nd}$ boot code and flash loader, for flash and other memory authentication such as described in FIG. 4 and FIG. 5. References to "2nd" mean a Flash Loader software in the apparatus (such as a wireless handset). The Flash Loader loads software external to the apparatus via a serial interface (e.g., SSI, UART, or USB) into a flash memory in the apparatus. References to "X Loader" mean bootstrap code that loads the rest of the code into Flash memory.

Then a step 2360 exits secure mode. Exit from Secure mode at step 2360 of FIG. 6 makes secure ROM space inaccessible, Security Control Register SECCTRL inaccessible, and secure RAM space inaccessible and establishes any other appropriate protections to additionally foster security. In some embodiments, any subsequent attempts to enter secure mode, even by the special Secure mode entry sequence of instructions and/or data, is detected as a security violation and protective measures follow immediately. For example, this approach is suitably used where all secure mode operations such as updating of data 2135 of FIG. 5 are required to occur by forced reboot. In other embodiments, specified operations such as updating of such data are permitted to occur at run-time and enter secure mode.

Next, a step 2370 executes the now-authenticated XLoader/$2^{nd}$ boot code and Flash loader. Operations proceed on at CONTINUE 2380 to execute applications. Secure mode is suitably reentered as needed to accomplish secure operations such as protected applications 2090 of FIG. 3 and as elsewhere described herein.

The process, structure and description of FIG. 4 earlier hereinabove is not only applicable to improved security and communication between one modem processor 200 of FIG. 2A and one secure application processor 600 of FIG. 2E. FIG. 4 and its processor, structure and description herein apply to cases where 1) there is more than one modem processor and/or 2) the security functionality is split between several processing elements that are suitably smaller, or occupy other relative amounts of real estate compared to each modem processor or all modem processors combined. Distributed processing confers performance and power-saving advantages in systems as described further herein.

Figure 7:
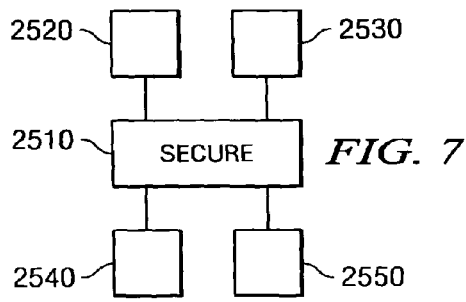
FIG. 7 is a block diagram of a system for improved security using a higher security processing block and a plurality of lower security processing blocks.

Turning to FIG. 7, a system has a secure application processor 2510 and at least two modems having one or more processors and memory. Coupled to secure apps processor 2510 is a first 2.5G (2.5 generation wireless) modem 2520, and a further 3G (third generation wireless) modem 2530. Additionally, other modems, modem processors, and other wireless and full-feature processors are provided in blocks 2540 and 2550, etc., and also coupled to the secure apps processor 2510. For example, a further wireless modem 2540 (e.g., WLAN 802.11 as in FIG. 2G and/or ultra wideband UWB 802.15.3) is or are provided. A video processor 2550 has DRM functionality enhanced as described herein by secure apps processor 2510. In this example, one, some or all of the processors 2520, 2530, 2540, 2550, etc. have no built-in security or less built-in security than the secure apps processor 2510.

Secure apps processor 2510 locks down certain regions of each modem memory in or associated with any one, some or all of the modems and blocks 2520, 2530, 2540, 2550, etc. Secure apps processor 2510 locks down those regions of modem memory from external access thereby providing a tamper proof environment. A secure firewall capability is also suitably used for the lock-down process. The secure apps processor 2510 communicates with each of the modems and blocks 2520, 2530, 2540, 2550, etc. in the manner described and shown in connection with FIGS. 3, 4, 5 and 6 hereinabove.

The system of FIG. 7 is suitably provided on five chips—one chip per processor and modem block of the illustration. In other embodiments, the two or more or all of the blocks of FIG. 7 are integrated onto the same chip so that the system is provided in four, three, or two chips of a multi-chip system. In the most highly integrated form, the system of FIG. 7 is provided on one single integrated circuit chip having cores or regions as shown, and the secure apps processor 2510 is a highly secure region or block among a number of less-secure regions or blocks on the single integrated circuit chip.

In the system of FIG. 7, and with the processes of FIGS. 3, 4, 5 and 6 suitably combined thereinto, the apps processor 2510 initializes and authenticates the memory contents of each modem 2520, 2530, 2540, 2550, etc. separately, either sequentially or substantially parallelizing secure communications, including providing each modem with a Public Key (the public/private key pair can either be the same for each modem, or different), and a different Random Seed. See steps 2110 and 2140 of FIG. 4. The secure apps processor 2510 then activates the memory protection mechanism and each modem then has its own respective authenticated communication mechanism with the secure apps processor 2510.

In FIG. 7, each of the modems and blocks 2520, 2530, 2540, 2550, etc. challenges the secure apps processor 2510 as in step 2150 of FIG. 4. Secure apps processor 2510 responds with a signed file structure, as in step 2160 of FIG. 4, to the challenge from each of the modems and blocks 2520, 2530, 2540, 2550, etc. of FIG. 7. The system architecture of FIG. 7 is suitably extended to any number of blocks 2520, 2530, 2540, 2550, etc. which are called "security client processors" herein, working with more secure block 2510 called a "security provider processor" herein.

Figure 8:
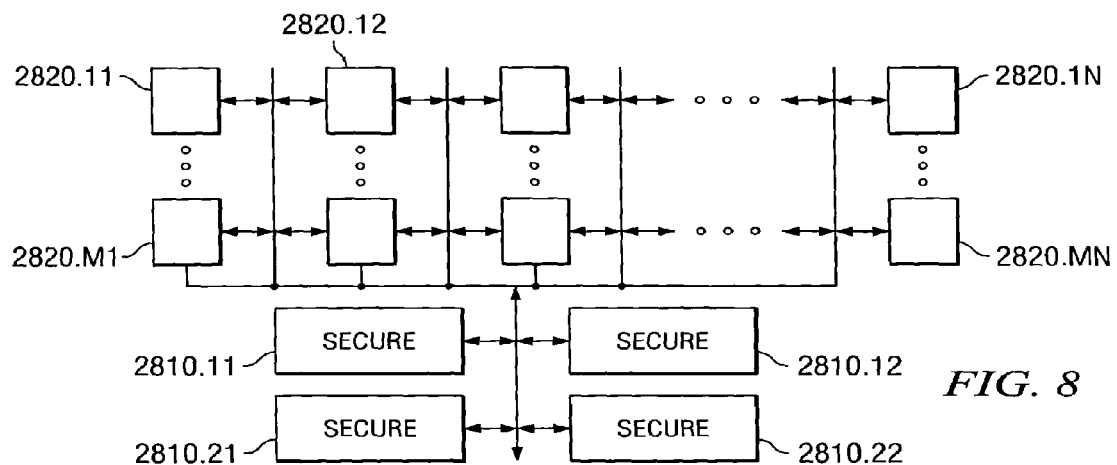
FIG. 8 is a block diagram of a system for improved security using a plurality of higher security blocks and one or more lower security blocks.

In FIG. 8, the secure processing is partitioned among two or more secure processors 2810.11, 2810.12, 2810.21, 2810.22 etc. The secure processors have an array or grid-like structure, or a linear structure 2810.11, . . . 2810.1N, or an even more complex structure. Similarly, the modem and other less-secure processing is provided in an array structure 2820.11, 2820.12, 2820.1N, . . . , 2820.M1, . . . 2820.MN where M and N are counting numbers. If M=N=1, then there is a single modem processor 2820.11. If M=2 and N=4, then eight modem and other processors 2820.11 through 2820.24 are provided as shown in FIG. 8.

A particular example of the system of FIG. 8 includes a modem processor 2820.11 and multiple secure processors 2810.11 and 2810.12 at least. One of the secure processors 2820.11 performs boot-time (initialization and authentication and memory locking) aspects 2140 of the security process of FIG. 4. Each modem processor 2820.11, etc. performs the random challenge step 2150 to another secure processor such as processor 2810.12. Such other secure processor 2810.12 acts as a secure storage module where the SIMlock file 2135 is stored and information therefrom supplied in step 2160. Each modem processor 2820.11, etc. of FIG. 8 performs integrity verification of step 2180 of FIG. 4.

In other embodiments the various steps of a secure processor in FIG. 4 are performed by one, some, or all of the secure processors 2820.11, etc. in FIG. 8. Also, the various steps of a modem processor in FIG. 4 are performed by one, some, or all of the less-secure modem and other processors 2820.11, 2820.12, etc. in FIG. 8.

In FIG. 9, a target 2910 includes an architecture having at least one less-secure modem processor portion and at least one more-secure apps processor portion. Target 2910 is suitably implemented as in any of FIG. 3, 7 or 8 or otherwise as described herein. Target 2910 is coupled to a memory 2920 including a flash or other memory for holding MEPC certificate, MEPD data, and Modem SW as described earlier hereinabove.

In FIG. 9 a host machine 2930 is coupled both to target 2910 and to a secure server 2940. Host machine 2930 provides a Flash Loader and a device bound certificate (DBC) of FIG. 3A including the MEPC certificate to Target 2910 in response to a public ID from target 2910 and authorization and MEPC certificate from secure server 2940.

In some embodiments, a method of providing data security includes, storing data in a first memory of a first processor having hardware-based security, operating a second processor to authenticate the data in the first processor, and operating the first processor to send the data from the memory of the first processor to a second memory external to the first processor. The authentication can be performed before, after or concurrently relative to when the data is sent. Operating the first processor to send data suitably also leaves the original data in the memory of the first processor. In some embodiments, the second memory is either in or associated with the first processor or instead in or associated with the second processor. In some embodiments, the authenticated data is sent directly from the first memory to the first processor for processing. The second memory is accessible by the second processor and the first processor is operated to send the data in a confidential manner. As a result, more secure inter-processor communication occurs.

In an embodiment, a system includes a modem processor that is capable of secure boot in that the modem processor authenticates and initializes its own contents. The modem processor generates a random seed at boot time or, a new random number at run-time, each time the seed or random number is needed. The modem processor in this embodiment lacks an ability to access secure storage locally, however. Further, in this embodiment, SIMlock protection is not already part of a custom ROM code of the modem processor. Then, an external, secure (applications) processor is further provided. For accessing secure storage, the modem processor having the functions and functional constraints just described relies on the resources of the external secure (application)

processor using the process and system described hereinabove in connection with FIGS. 3 and 4.

It is emphasized here that while some embodiments may have an entire feature totally absent or totally present, other embodiments, such as those performing the steps of FIGS. 3, 4, 5 and 6 have more or less complex arrangements that execute some code portions, selectively bypass others, and have some operations running concurrently sequentially regardless.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, and other circuitry, and digital computers including microprocessors and microcomputers of any architecture, or combinations thereof. Internal and external couplings and connections can be ohmic, capacitive, direct or indirect via intervening circuits or otherwise as desirable. Implementation is contemplated in discrete components or one or more fully integrated circuits in any materials family and combinations thereof. Various embodiments of the invention employ hardware, software or firmware and combinations of any of them. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A system comprising:
   a first processor including a less-secure processor;
   a second processor including a more-secure processor that is more secure than said less-secure processor;
   wherein the first processor is capable of secure boot by authentication and initialization of software for the first processor, said first processor operable to receive a random seed at boot time and to generate a new random number at run-time and, for purposes of receiving personalization data from the second processor, to generate a challenge based on the new random number; and
   wherein the second processor has a secure storage for personalization data and is operable to supply said first processor with the personalization data in signed form in response to the challenge from said first processor, whereby the first processor relies on the second processor.

2. The system of claim 1 wherein said second processor has a private key for an asymmetric secure communications process used to sign the personalization data and said first processor has a public key for that asymmetric process.

3. The system of claim 1 wherein said first processor has a challenge-failure operation selected from the group consisting of warning message on user display, retry, disablement of wireless communication, initiation of an automatic call, and system reset.

4. The system of claim 1 further comprising an enclosure and wherein said first processor and said second processor are provided on respective chips in said enclosure.

5. The system of claim 1 wherein said first processor and said second processor are on a same one chip.

6. The system of claim 1 wherein said first processor includes a modem processor.

\* \* \* \* \*